Figure 1:
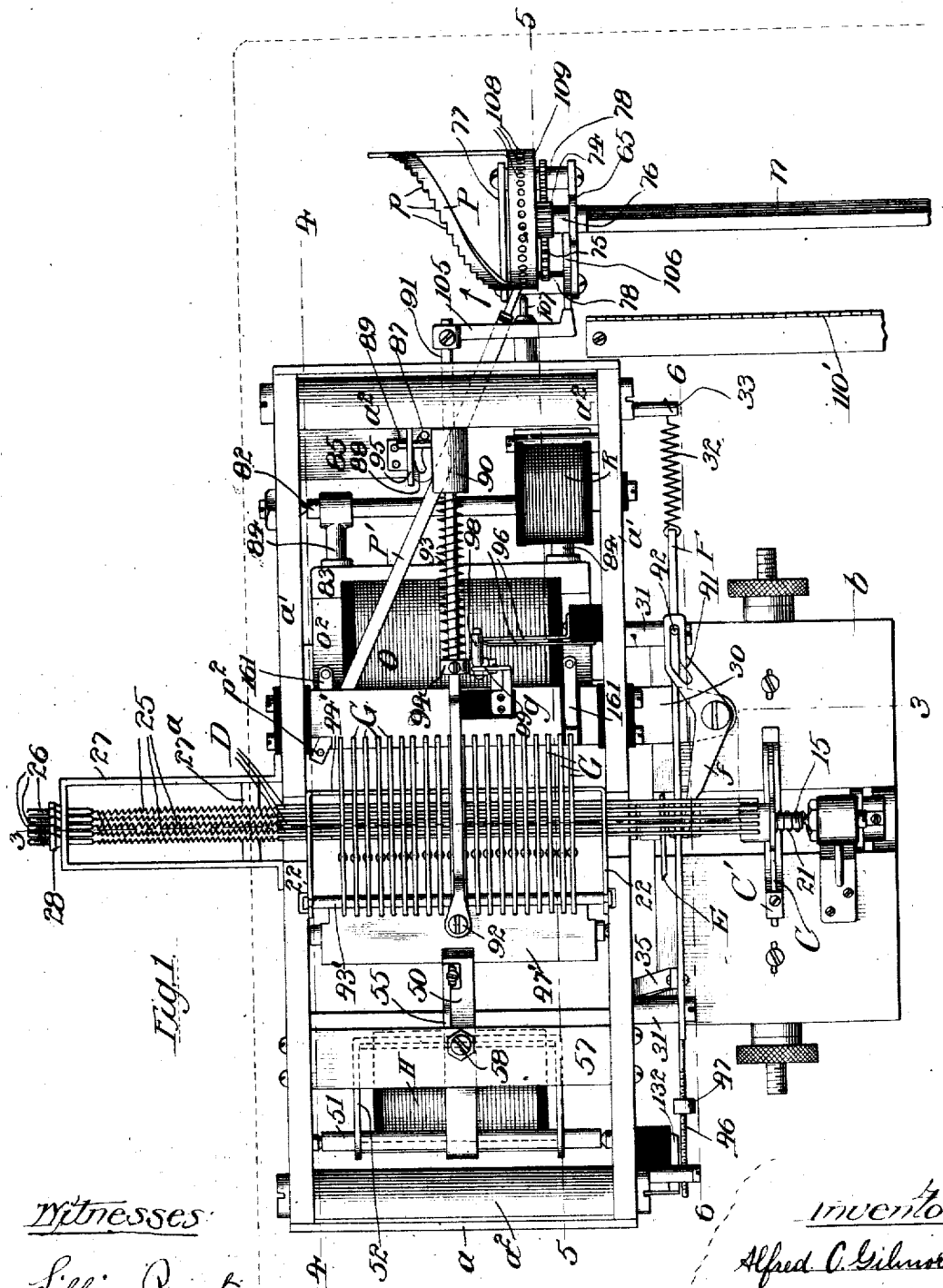

A. C. GILMORE.
AUTOMATIC TELEGRAPH AND SELECTIVE SYSTEM THEREFOR.
APPLICATION FILED OCT. 6, 1904.

931,055.

Patented Aug. 17, 1909.
10 SHEETS—SHEET 3.

Witnesses:
Lillian Prentice

Inventor:
Alfred C. Gilmore
By Peirce + Fisher
Attys.

A. C. GILMORE.
AUTOMATIC TELEGRAPH AND SELECTIVE SYSTEM THEREFOR.
APPLICATION FILED OCT. 6, 1904.

931,055.

Patented Aug. 17, 1909.
10 SHEETS—SHEET 6.

A. C. GILMORE.
AUTOMATIC TELEGRAPH AND SELECTIVE SYSTEM THEREFOR.
APPLICATION FILED OCT. 6, 1904.

931,055.

Patented Aug. 17, 1909.
10 SHEETS—SHEET 8.

A. C. GILMORE.
AUTOMATIC TELEGRAPH AND SELECTIVE SYSTEM THEREFOR.
APPLICATION FILED OCT. 6, 1904.

931,055.

Patented Aug. 17, 1909.
10 SHEETS—SHEET 9.

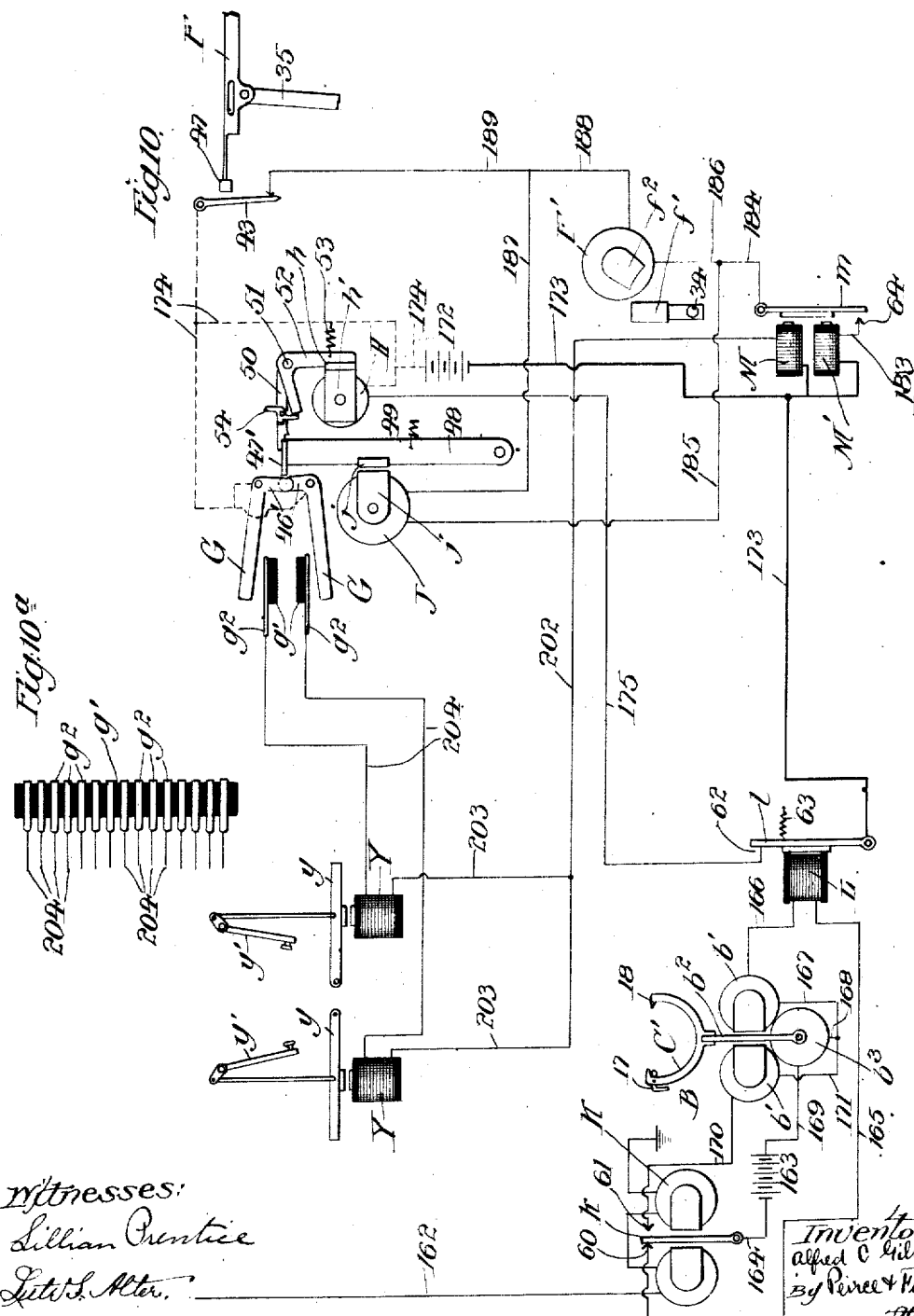

UNITED STATES PATENT OFFICE.

ALFRED C. GILMORE, OF CHICAGO, ILLINOIS, ASSIGNOR TO JAMES H. PEIRCE, TRUSTEE, OF CHICAGO, ILLINOIS.

AUTOMATIC TELEGRAPH AND SELECTIVE SYSTEM THEREFOR.

No. 931,055.      Specification of Letters Patent.      Patented Aug. 17, 1909.

Application filed October 6, 1904. Serial No. 227,466.

*To all whom it may concern:*

Be it known that I, ALFRED C. GILMORE, a citizen of the United States, and a resident of Chicago, county of Cook, and State of Illinois, have invented certain new and useful Improvements in Automatic Telegraphs and Selective Systems Therefor, of which the following is declared to be a full, clear, and exact description.

The invention relates to automatic telegraphs and selective systems in which signals or characters are transmitted over the line by varied current impulses and in which a selective apparatus controlled by the line impulses is arranged to selectively control the type of a printing or linotype machine or other mechanism by which the signals may be automatically indicated.

The present system and apparatus is particularly designed for selectively controlling a printing machine and seeks to provide simple and effective means by which the type corresponding to the signals or characters may be rapidly operated so that the apparatus may be used for ordinary commercial purposes and by stations now usually equipped with Morse sounders.

A further object of the invention is to provide a selective system in which the characters are represented by different numbers of variably modified impulses and preferably by different numbers of variably timed impulses of a "dot" and "dash" code, so that it may be employed in connection with the duplex and quadruplex systems of telegraphy, and further to provide a single relay arranged to variably respond to the varied number and order of impulses in the different code combinations to control the selector mechanism.

A further object is to provide means whereby the relay, which is controlled by the line impulses may directly and mechanically operate a set of selectors controlling the type mechanism.

A further object of the invention is to provide an improved form of type wheel mechanism which may be quickly and rapidly operated to record the signals or characters.

With these objects in view, the invention consists in the arrangement set forth in the following description, illustrated in the accompanying drawings and particularly pointed out in the appended claims.

Figure 2:
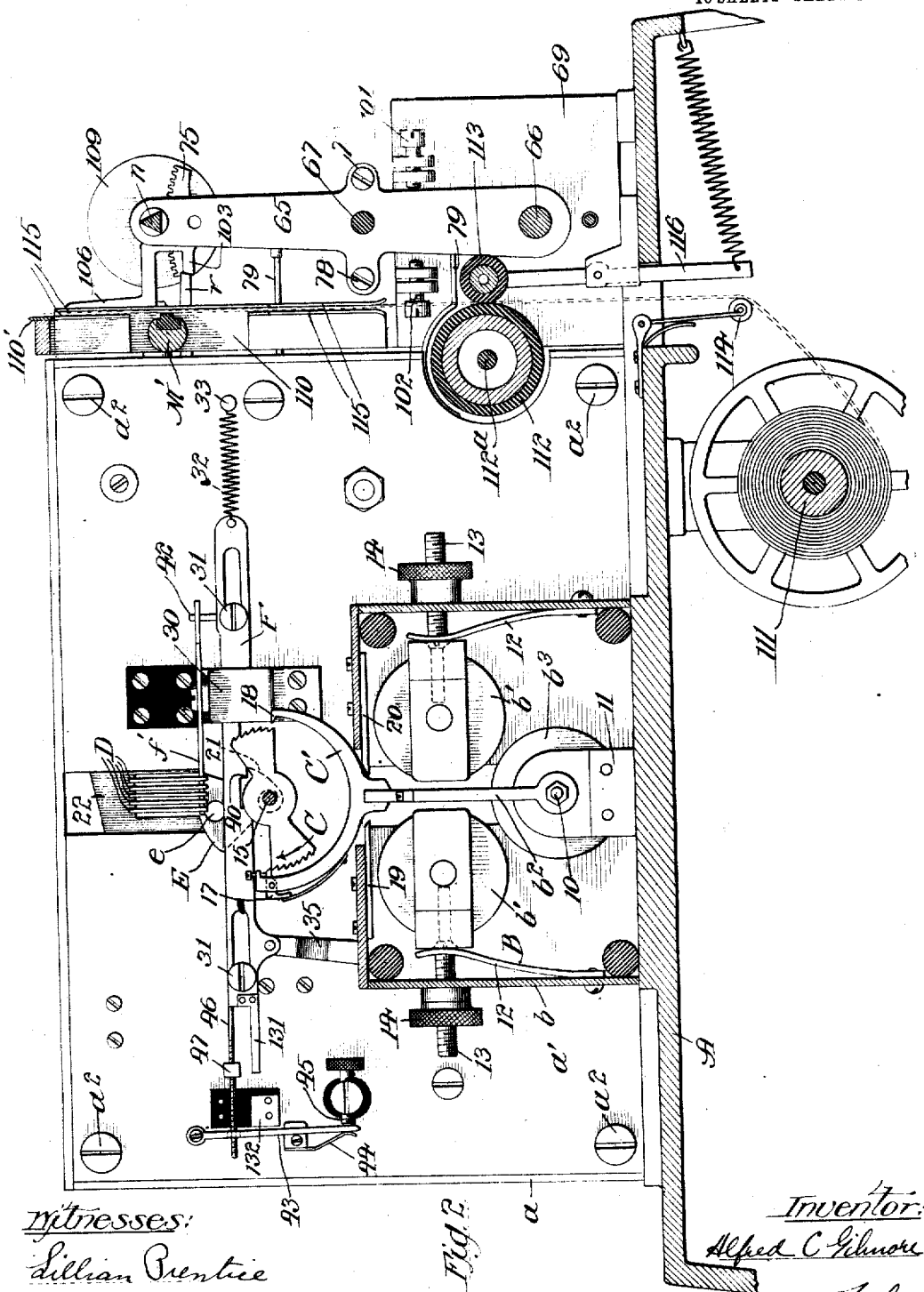
Figure 3:
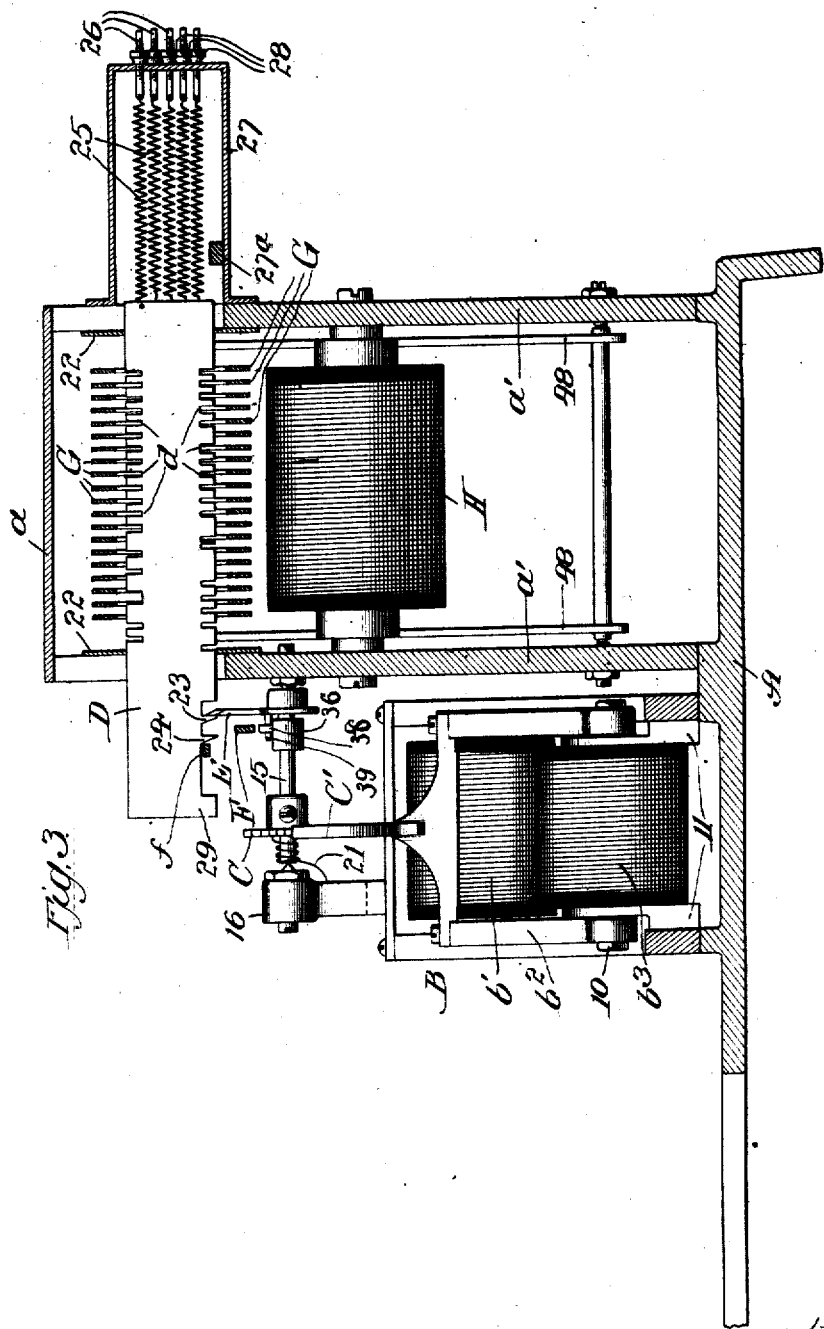
Figure 4:
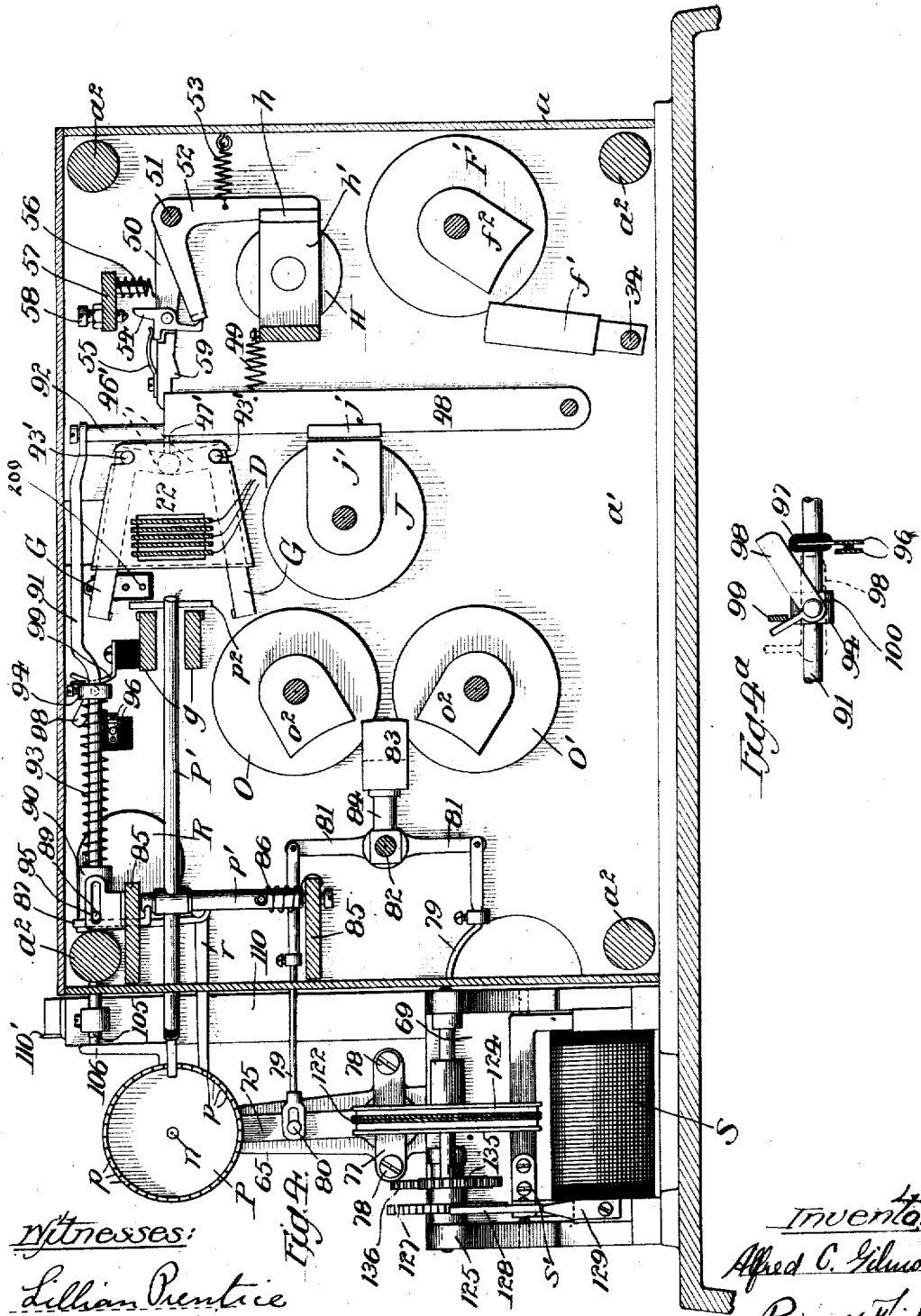
Figure 5:
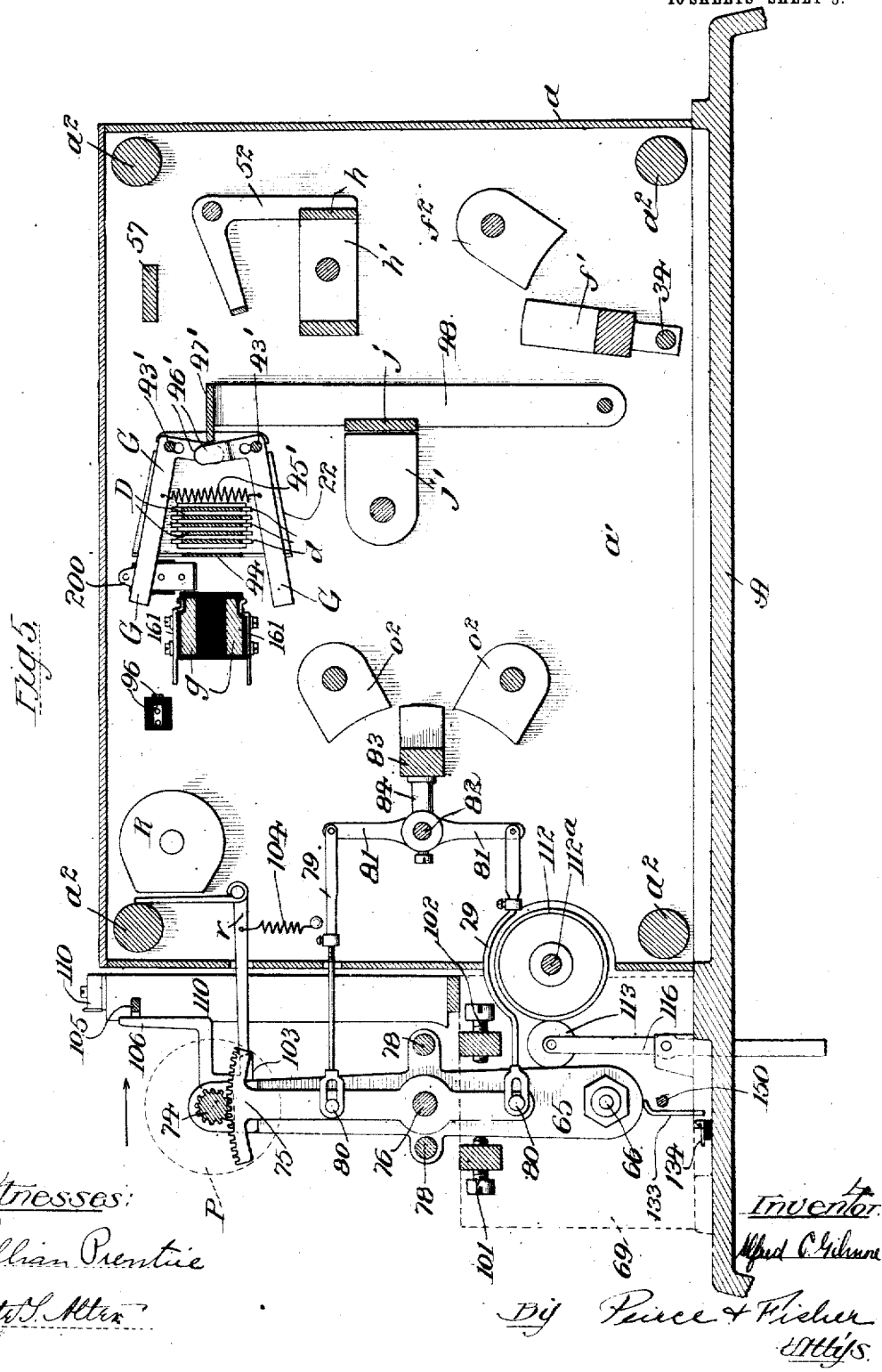
Figure 6:
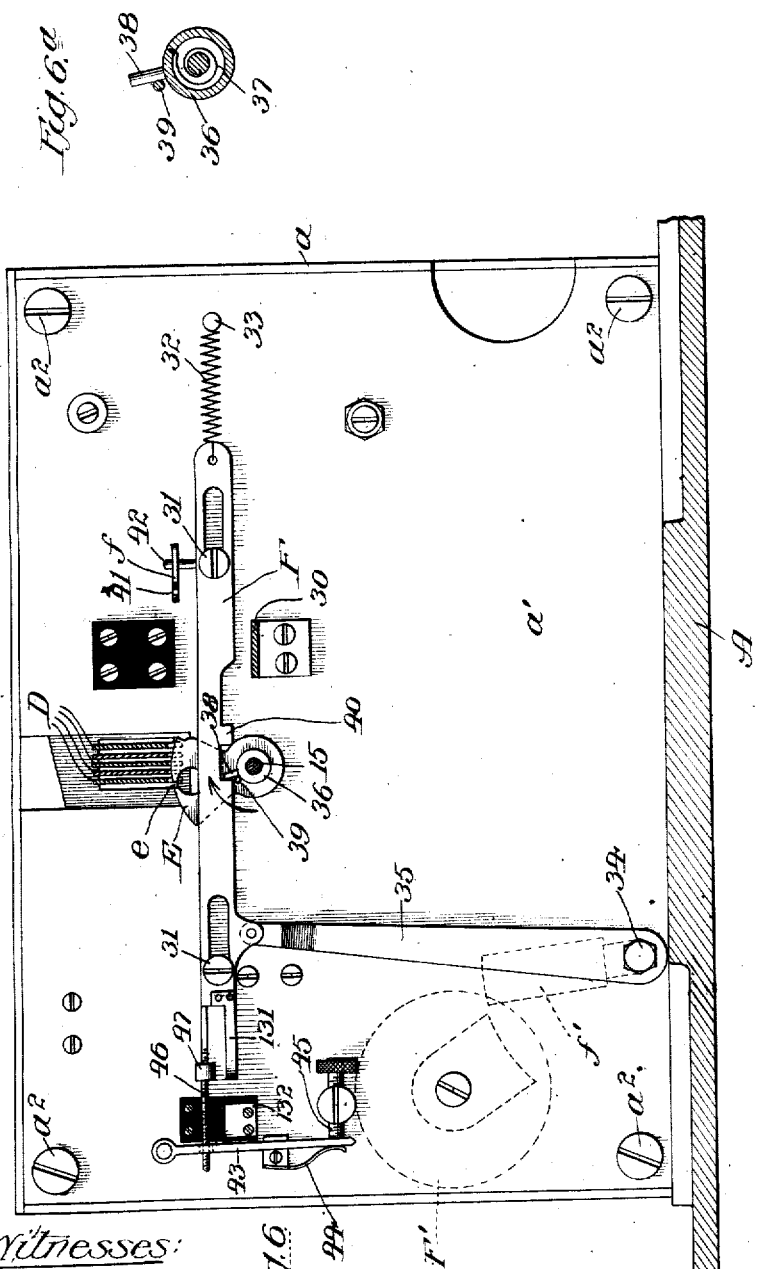
Figure 7:
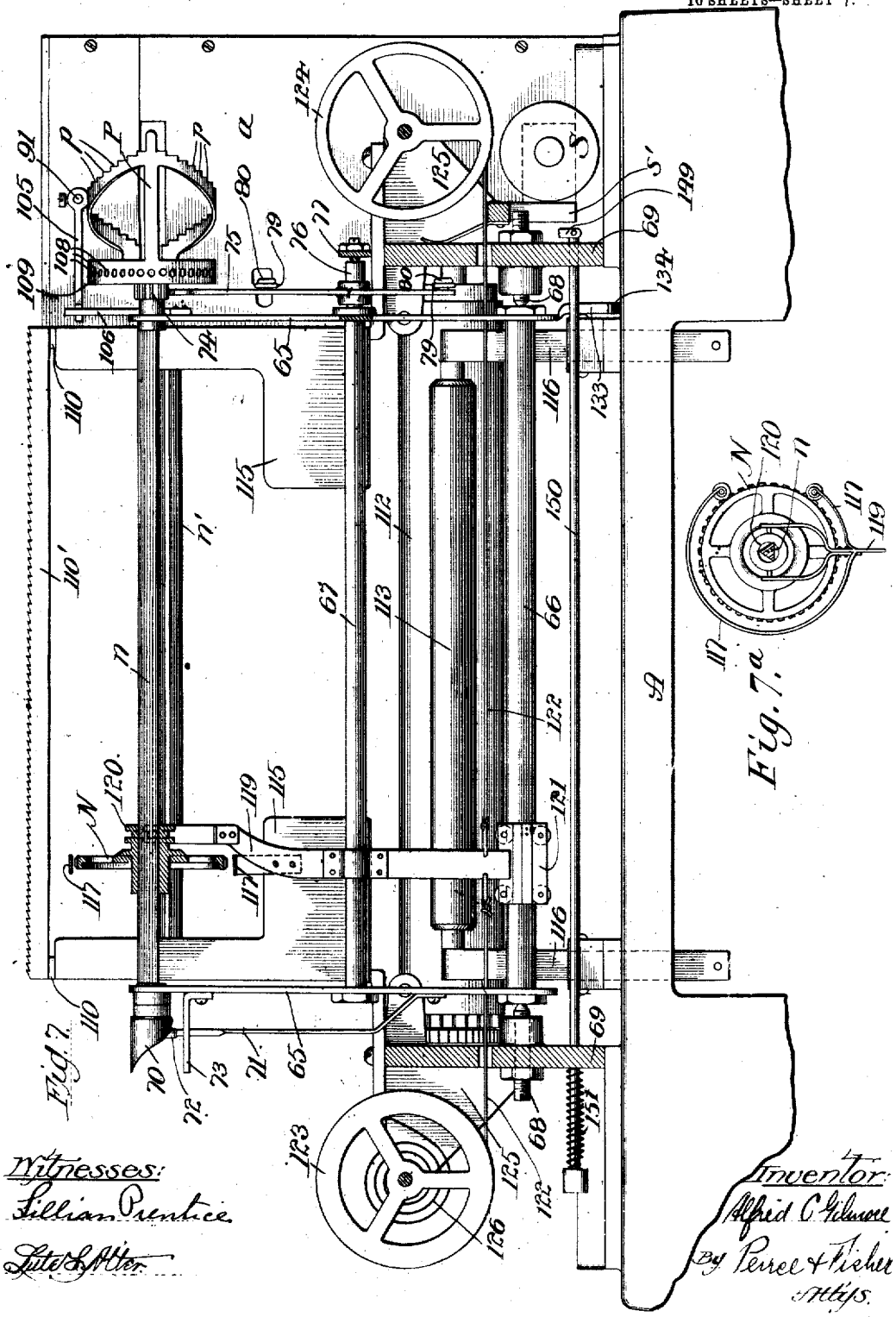
Figure 8:
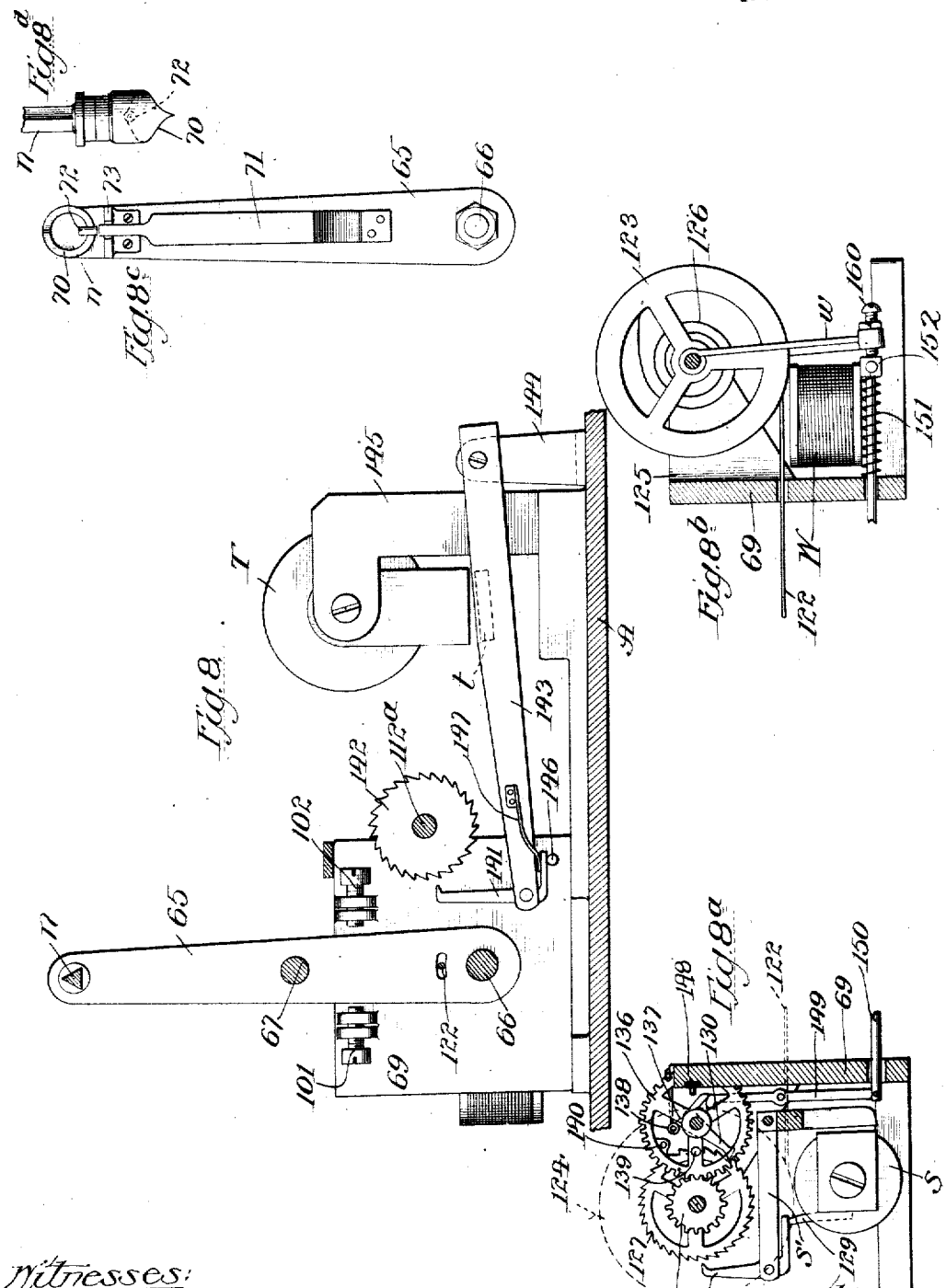
Figure 9:
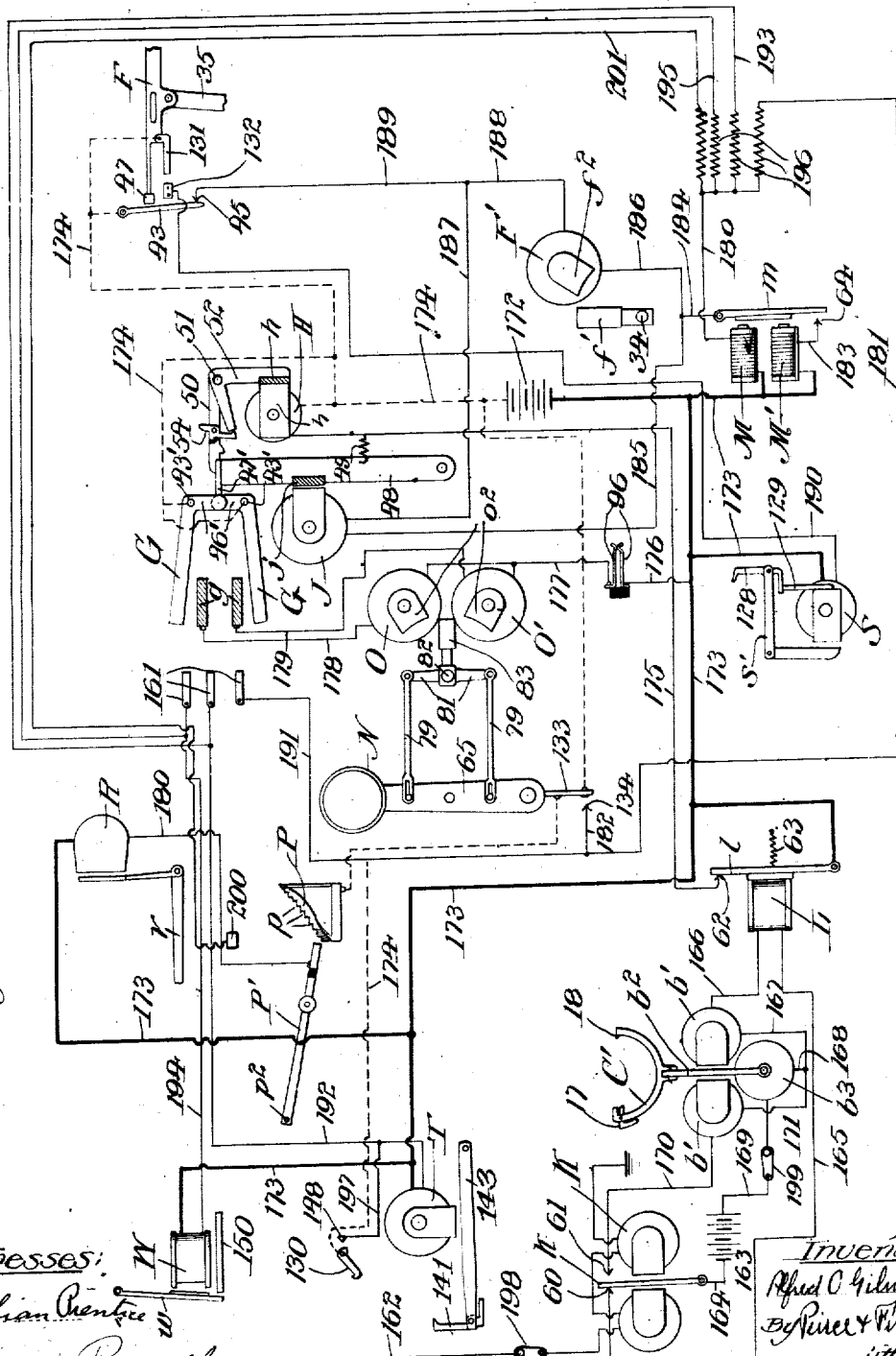

In the drawings: Figure 1 is a plan of the improved selective apparatus. Fig. 2 is a side elevation thereof, the inclosing case for the selector, controlling relay and other parts being shown in section. Fig. 3 is a section on line 3—3 of Fig. 1. Fig. 4 is a section on line 4—4 of Fig. 1. Fig 4$^a$ is a detail view of parts shown in Fig. 4. Fig. 5 is a section on line 5—5 of Fig. 1 illustrating the selector restoring mechanism. Fig. 6 is a cross section on line 6—6 of Fig. 1. Fig. 6$^a$ is a detail section of parts shown in Fig. 6. Fig. 7 is an elevation of the printing and paper-carrying mechanism. Fig. 7$^a$ is a detail view in elevation of the type wheel. Fig. 8 is a detail view illustrating the line space mechanism for the printer. Figs. 8$^a$ and 8$^b$ are detail views of the letter-space mechanism for the printer. Figs. 8$^c$ and 8$^d$ are detail elevations and plan views respectively of the centering device for the type wheel. Fig. 9 is a diagram of the selector controlling and operating circuits. Fig. 10 is a diagram of a modified arrangement of operating circuits. Fig. 10$^a$ is a detail plan view of a part shown in Fig. 10.

The frame for supporting the selective and printing apparatus comprises the base A whereon are mounted a pair of upright plates $a'$, held apart by bolts $a^2$ and forming the sides of an inclosing casing $a$.

The selective controlling relay B is arranged within an inclosing casing $b$ on the base A at one side of the casing $a$. The relay B is traversed by all impulses received and responds differently to the varied code impulses. To insure sensitive rapid operation, this relay is preferably polarized and comprises a pair of spools having laterally extending poles arranged on opposite sides of a yoke-shaped armature $b^2$ (see Figs. 2 and 3). The armature $b^2$ is mounted upon pivots 10 extending through uprights 11 and engaging the core of a third magnet spool $b^3$, so that the armature $b^2$ is polarized by the action of the magnet $b^3$. The current is arranged to traverse alternately in opposite directions through the spools $b'$, but always in the same direction through the spool $b^3$ so that the armature $b^2$ is alternately shifted between the poles of the magnets $b'$. Spools $b'$ are mounted as shown, upon the free ends of springs 12 which are secured at their lower ends to the sides of the casing $b$ and also upon the inner ends of adjusting screws 13 extending through the walls of the casing $b$ and provided on their outer ends with thumb nuts 14. By this means the spools $b'$ may be adjusted to and from the armature $b^2$ and securely held in adjusted position.

Above the relay B is arranged a step-by-step mechanism preferably in the form of an escapement. An escapement member C comprising diametrically arranged tooth segments, is mounted upon a shaft 15 journaled between one of the upright plates $a'$ and a standard 16 mounted upon casing $b$. An anchor $C'$ is connected to the upper end of the relay armature $b^2$, and projects from the opening in the upper part of the casing $b$. Dogs 17 and 18 on the yoke $C'$ are arranged to engage the teeth of the escapement member C. A pair of stops 19 and 20 are adjustably held in position upon the top plate of casing $b$ and are arranged on opposite sides of the yoke $C'$, to limit its to-and-fro motion.

The energizing circuit for the relay B normally passes through one of the spools $b'$ so that the armature $b^2$ is held against stop 20 with the dog 17 in engagement with the escapement member C, as shown in Fig. 2. When the current is reversed the yoke $C'$ is moved against stop 19, dog 17 is shifted out of engagement with escapement member C and dog 18 into engagement with the teeth thereof, and these dogs are so arranged that this shift permits the forward movement of the escapement member C in the direction of the arrow one-half a tooth under the influence of its actuating spring 21. The second current reversal or restoration of the line to normal condition permits the reëngagement of dog 17 with the succeeding tooth of the escapement member C and a further shift thereof to complete the step. In this manner, as the current impulses are received over the line, escapement member C is shifted step by step at each current reversal through the polarized relay B. At each operation, escapement member C is shifted one or more complete steps in accordance with the number of impulses in the different code combinations, and it will be variably held in the different positions in accordance with the lengths of the impulses. A suitable selector controller is correspondingly shifted one or more steps and variably held in the different shifted positions by the escapement mechanism and is arranged to effect the successive and variable shifts of a series of selective devices.

The series of selectors are preferably in the form of bars D mounted to slide through the upper portion of the casing $a$ and supported at opposite ends by slotted guides 22, fixed to the inner faces of the plates $a'$. The selector bars D are preferably mechanically controlled by the escapement C, $C'$. For this purpose a controlling shifter E in the form of a segmental plate, is fixed to the shaft 15. Each of the selector bars is provided with two teeth 23 and 24 on its lower edge near its inner end (see Fig. 3), and the tooth 23 on each bar normally engages the controller E by which the several bars are held in normal position against the tension of their actuating springs 25. The actuating springs 25 are secured to the outer ends of the selector bars and to a series of adjusting screws 26. The latter are supported within a casing 27 upon the outer face of the casing $a$, and the thumb nuts 28 on the screws 26 engage the outer face of the casing 27 and hold the springs 25 under the desired tension.

The controller E is provided with a slot $e$ (see Fig. 6) which, as the controller is actuated by the step-by-step escapement mechanism, is successively brought in line with one or more of the selector bars in accordance with the varying number of impulses in the different code combinations. At the first line reversal the slot $e$ is brought in line with the teeth on the first selector bar, and this bar is shifted by its actuating spring 25. At the second current reversal, or at the end of the first complete line impulse and at the end of the first complete step of the escapement mechanism, the slot occupies the position intermediate the first and second selector bars. At the second line impulse and second step of the escapement mechanism, the slot $e$ in the controller is first brought in line with the teeth on the second selector bar and then shifted to a position between the second and third bars, so that the second bar is shifted by its actuating spring. In a similar manner the third, fourth and fifth line impulses when they occur in the different combinations actuate the controller to effect the shift of the third, fourth and fifth selector bars. If the impulse which brings the slot $e$ and the controller E in line with each of the bars is short, the tension of the springs 25 is such that the tooth 23 thereon will alone pass through the slot and the shift of the bar will be arrested by the engagement of the tooth 24 with the controlling shifter, but if the impulse is slightly prolonged both teeth 23 and 24 will pass through the slot and the bar will be shifted to a greater extent, being arrested by the engagement of the end of the bar with a cross stop $27^a$ on the support 27.

Each of the bars D is provided with a stop lug 29 on its opposite end and an arm $f$ extends beneath all of the selector bars D in line with the stop lugs thereon. Arm $f$ is pivoted as shown, to a bracket 30 secured to the inner upright plate $a'$. By this means one or more of the selector bars are successively shifted in accordance with the different numbers of impulses in the several code combinations, and are shifted to different extents in accordance with the variable timing of the impulses. Any number of selector bars may be employed, but with five as shown, it is possible to obtain fifty-four different combinations which are amply sufficient for telegraphic work.

A restoring bar F for the selector mechanism, is mounted to slide longitudinally upon a pair of pins 31 fixed to the inner side plate $a'$ and is held in normal position by a spring 32 extending between the end of the bar and a pin 33 fixed to the side plate $a'$ of the casing $a$.

A restoring magnet F' (see Fig. 4) is arranged between the side plates $a'$ of the casing $a$ and is provided with laterally extending poles $f^2$ arranged to actuate a swinging armature $f'$, mounted upon a shaft 34. Shaft 34 is journaled in the side plates $a'$ and carries on its inner end (see Fig. 6) an upright arm 35 which is pivoted at its upper end to one end of the restoring bar F.

A sleeve 36 is loosely mounted upon the shaft 15 adjacent the controlling plate E, but is connected to the shaft by a coiled spring 37, as shown in Fig. 6$^a$. Sleeve 36 is provided with an upwardly extending pin 38 arranged to engage a laterally extending pin 39 upon the controlling shifter E. Pin 38 is arranged in the path of the lug 40 on the lower edge of the restoring bar F, and is arranged to coöperate therewith to effect the return of the selecting apparatus to normal position. The arm $f$ (see Fig. 1) is provided with an angular slot 41, a portion of which is parallel with and above the restoring bar F and within which slot extends a vertical pin 42 fixed to the upper edge of the restoring bar.

In the energizing circuit of the restoring magnet F' is arranged a pair of contacts comprising a swinging contact arm 43 pivoted to the side plate $a'$ and normally held by a spring 44 in engagement with a contact pin 45. An extended portion 46 upon the restoring bar F, extends through an opening in the contact arm 43 near its pivoted end, and a collar 47 is adjustably threaded upon the extension 46. Suitable means are provided for closing the energizing circuit of the magnet F' at the pauses between completed code combinations, irrespective of the number of impulses in the different combinations, and after the signal has been made. When the magnet F' is thus energized the restoring bar F is shifted against the tension of spring 32. During the first part of this shift lug 40 engages pin 38, which through the medium of pin 39 shifts controller E, shaft 15 and escapement member C backward until the controlling plate E is entirely out of the path of the selector bars D. The normally engaged dog 17 on the escapement anchor C' (see Fig. 1) is spring-held as shown, in one direction to permit this backward shift of the escapement member C and controlling plate E. During the first portion of the shift of restoring bar F, the pin 42 travels in the parallel portion of the slot 41 in the arm $f$. During the second part of the shift of the restoring bar F, it engages the inclined portion of the slot 41 and thereby shifts the arm $f$ to restore the selector bars to normal position. At the end of the forward shift of the restoring bar F, lug 40 passes beyond the pin 38 and controller E and escapement member C are shifted by their actuating spring 21 in forward direction until engaged by the dog 17 on the escapement anchor C'. In this position the controlling plate E engages the teeth 23 on all of the selector bars and holds them in normal position preparatory to a succeeding operation.

At the extreme end of its forward movement, collar 47 on the extension 46 of the restoring bar F, engages contact arm 43, shifts the same and opens the energizing circuit of the restoring magnet F'. Restoring bar F and restoring arm $f$ are then returned to normal position by the spring 32. During this return, lug 40 on the bar F engages pin 38, shifts it out of its path and passes beyond the same to normal position, but this movement of the pin 38 does not affect the selector controlling plate E and the escapement member C upon the shaft 15. The collar 36 and pin 38 thus form a one-way yielding connection between the restoring bar F and the selector controlling device.

The shift of the selector bars into any one of fifty-four different positions by the variably modified code combinations may be utilized in various ways to selectively control the signal-making mechanism. Preferably however, these bars are arranged to control a series of signal-making devices or switch arms G. These arms are pivotally mounted as shown, above and below the selector bars upon rods 43' arranged between the side supports 22. The forward ends of the arms G are arranged to slide in slots formed in a vertically arranged plate 44', extending between the front edges of the side supports 22 and springs 45', extending between the upper and lower arms G, tend to shift the arms toward the selector bars. The pivoted ends of the arms G are provided with laterally projecting tail pieces 46', the tail pieces of the upper set of arms overlapping those of the lower set, as shown in Fig. 5. These tail pieces are arranged to be engaged by a cross bar 47', arranged between the upper ends of a pair of arms 48, which are pivoted at their lower ends to the side plates $a'$. A spring 49 (see Fig. 4) connected to the side bars 48, tends to hold the cross bar 47' away from the tail pieces 46' on the arms G, but the cross bar is held in normal position against the tension of spring 49 by a latch 50 pivoted upon a cross shaft 51 which extends between the sides pieces a'. In the normal position of the cross bar 47', the arms G are normally held above and below the selector bars D with the actuating springs 45' under tension.

The central selector bars are provided on their upper and lower edges with a series of slots d (see Fig. 3) so arranged that with any given combination, a row of slots in the several bars are in line with one, and one only of the arms G. When latch 50 is then shifted to release cross bar 47' and the arms G, the selected arm may be moved by its actuating spring 45' into engagement with one of a pair of transverse contact bars g. These contact bars extend between the side plates a', but are insulated therefrom, as shown in Fig. 1. One of the bars coöperates with the upper set of arms G and the other with the lower set. The number of signal-making devices or controlling arms G corresponds to the number of characters or signals in the desired code, and the several selector bars D are so shifted by the different combinations of code impulses to permit the shift of the signal-making arms corresponding thereto. Any desired number of signal bars G may be employed. In the form shown forty are used, which are sufficient for telegraphic purposes. With five selector bars fifty-four of the signaling arms could be employed if desired, and with additional selector bars, a greater number of signal-making arms could be selectively controlled.

An actuating magnet H for the latch 50, is arranged between the side plates a' and provided with laterally extending poles h' controlling an armature h, fixed to one arm of a bell crank 52. Bell crank 52 is mounted upon shaft 51 as shown, and since the energizing circuit of magnet H is normally closed, it is normally held up against the tension of its actuating spring 53. A pawl 54 is pivoted upon the latch 50 and a spring 55 engaging the pawl presses the tail piece thereof against the end of the bell crank 52. Latch 50 is pressed downwardly by a coiled spring 56, extending between the latch and a cross bar 57, arranged between the side plates a'. An adjustable trip-pin 58 in the cross bar 57, is arranged to engage the upper end of the pawl 54 and shift the same against the tension of its spring 55.

A restoring magnet J for the signal controlling arms G is arranged between the side plates a' and is provided with laterally extending pole pieces j' coöperating with an armature j, fixed to the upright arms 48.

The parts are shown in normal position in Fig. 4 and as stated, the energizing circuit through the latch magnet H is normally closed. At the first impulse of a signal however, it is opened, bell crank 52 is shifted by its spring 53 and its end moved below the tail of pawl 54. Spring 55 then serves to shift pawl 54 to bring its tail piece above the end of the bell crank 52. At the pause between completed code combinations, the energizing circuit of magnet H is again closed, armature h is drawn up, bell crank 52 is shifted against the tension 53 and latch 50 is raised against the tension of spring 56 through the medium of pawl 54. The transverse bar 47' and the arms G are thereby released, transverse bar 47' is drawn back by spring 49 into engagement with a lug 59 on the latch 50 and the selected arm G is actuated by its spring 45'. At the end of the upward shift of the latch 50 pawl 54 engages the trip-pin 58 and is shifted against the tension of its spring 55 so that its tail-piece is moved over the end of the bell crank 52. The latch is then pressed downwardly by spring 56 in readiness to reëngage the transverse bar 47'. As soon as the signal is made, the energizing circuit through magnet J is closed and the transverse bar 47' is shifted to restore arms G to normal position and out of the path of movement of the selector bars D, the arms G and the transverse bar 47' being locked in the restored normal position by the latch 50. At the same time the restoring magnet F' is operated to first shift the escapement mechanism and controlling plate out of the path of the selector bars D and then restore the selector bars D and finally break the restoring circuit by shifting contact arm 43. The restoring circuit of the magnet J is also broken by the disengagement of the contacts 43 and 45. The parts are then in normal position shown, in readiness to repeat the operation.

The selector controlling relay B could, if desired, be arranged in the line circuit but is preferably energized from local battery, the circuit of which is controlled by a line relay K (see Fig. 9), which is polarized and arranged to shift armature k between contacts 60 and 61, to alternately effect the flow of current through the spools b' of the relay B. Line relay K normally holds its armature k against contact 60 and normally closes the energizing circuit of the magnet L so that the latter normally holds its switch armature l into engagement with the contact 62. Switch armature l and contact 62 are arranged in the energizing circuit of the trip magnet H, so that as stated, armature h and bell crank 52 are normally held up against the tension of its actuating spring 53.

At the first reversal of the current through the line, the circuit through magnet L is broken and switch armature l is drawn out of engagement with contact 62 by a spring 63. This opens the energizing circuit of magnet H and the trip 52 is drawn back by its spring. As any given signal is received the energizing circuit through the magnet L is of course opened and closed, but the length of the impulses is determined by variably prolonging the contact between spring armature k and contact 61 so that the armature is not held against the contact 60 to close the circuit through magnet L for any appreciable length of time except at the pauses between completed code combinations representing the different signals. Spring 63 of armature l is held under such a tension that the brief closing of the energizing circuit of the magnet L as the signal is received, is insufficient to draw up armature l so that this armature is only drawn up at the pauses between the completed signals. When this occurs the energizing circuit of magnet H is closed and lock 50 is tripped by bell crank 52 to release the arms G as previously described, so that the selected arm may be operated into engagement with one of the contact bars g to effect the operation of the signal-making mechanism. As stated, the signals or characters are represented by different numbers of variably modified impulses so that short signals may be used for the most frequently employed signals or characters, but irrespective of the number of impulses representing the different characters, magnet L will only operate at the pauses between completed signals to effect the shift of the selected arms G which control the operation of the signal-making means.

The energizing circuit through the restoring magnets F′ and J is closed by a normally open switch armature m, arranged to be shifted into engagement with a contact 64 by a magnet M. The circuit of magnet M is closed by the operation of the signal-making mechanism. The shift of the armature m into engagement with contact 64, not only closes the circuit through restoring magnets F′ and J, but also through a second magnet M′ arranged to lock the circuit controller m for the restoring circuit in closed position until all parts are returned to normal. At this instant as above stated, the restoring circuit is opened by the disengagement of contacts 43 and 45 so that the restoring devices actuated by magnets F′ and J and the restoring circuit controller m return to normal position.

The selective operation of the arms G may be utilized in various ways to effect the automatic operation of a printing mechanism type-setting machine or other means by which the signals or characters could be made or indicated. The selective apparatus is however particularly designed for effecting the rapid operation of a suitable printing mechanism. For this purpose the selectively operating arms G are arranged to control a type wheel. In the form shown, the type wheel N is provided on its periphery with the character of type arranged in a single row. The type wheel is keyed upon a rotatable shaft n and is preferably arranged to slide longitudinally thereon to effect the letter-space movement of the printing mechanism. If desired, the letters could be properly spaced on the line by shifting the paper-carrying devices without departure from the invention. For quick operation, the type wheel shaft n is also preferably arranged to shift laterally in order to bring the selected type against the paper instead of employing a printing hammer. For this purpose, shaft n is rotatably mounted upon a shifting frame comprising upright side arms 65 connected at their lower ends by a cross bar 66 and intermediate their ends by a cross bar 67. The frame is mounted upon pivots 68′ arranged in line with the bottom cross-bar 66 and adjustably threaded through supports 69 upon the base A. The type wheel N is preferably so held in normal position that it may be rotated in opposite directions therefrom so that any type upon the periphery of the wheel may be brought to the printing point with the shortest possible movement of the type wheel.

On the end of the shaft n (see Figs. 7, 8ᶜ and 8ᵈ) is arranged a double helical cam 70 and a spring 71 fixed at its lower end to the adjacent upright 65 is arranged to engage the double cam 70 to yieldingly hold the type wheel N and shaft n in central position, but in such a manner that it can be rotated in either direction. The upper end of the spring 71, which engages the cam is preferably provided with an antifriction roller 72. A slotted guide 73 fixed to the upright 65, engages the upper end of the spring 71 and prevents lateral disengagement thereof as the type wheel and shaft are rotated. The opposite end of the shaft n is provided with a spur-pinion 74 arranged to be engaged by tooth segment 75. (See Fig. 5.) The latter is mounted upon a short shaft 76 (see Fig. 7) which is pivotally mounted between the adjacent upright 65 and a plate 77, secured to the arm by bolts 78 in off-set position. The segment 75 is shifted in opposite directions to correspondingly rotate the type wheel by a pair of arms 79 having slotted outer ends engaging pins 80 fixed to the segment on opposite sides of the shaft 76. The inner ends of the arms 79 are secured to arms 81 fixed upon a cross shaft 82 which is journaled between the side plates a′. A U-shaped armature 83 is secured to the shaft 82 by pins 84 and is arranged to be shifted in opposite directions by a pair of magnets O, O′. These magnets are mounted between the side plates a′ and are provided with laterally extending pole pieces o² radially arranged with reference to the shaft 82 (see Figs. 4 and 5).

As stated, the type wheel shaft and operating mechanism is normally held in central position by the spring 71 with the armature 83 midway between the pole pieces $o^2$ of the magnets O, O'. By energizing one or the other of these magnets the type wheel may be rotated in one or the other direction. The energizing circuit of the magnets O, O' are controlled respectively by the engagement of the selectively operated switch arms G with the transverse contact bars $g$. That is to say, if one of the upper sets of bars G is selected and engages the upper transverse bar $g$, contact will be closed through one of the type wheel operating magnets and if one of the lower sets of arms engages the lower bar $g$, the circuit will be closed through the other of the type wheel operating magnets.

The extent of shift of the type wheel in one or the other direction is controlled by a cylindrical stop-member P mounted on the end of the type wheel shaft $n$ adjacent the pinion 74 (see Figs. 1 and 7). This stop-member is provided with a double helical operating edge-portion having a series of steps $p$ corresponding respectively with the various type upon the wheel N. The shift of the type wheel is arrested in proper position to bring the selected character to the printing point by the engagement of the stop-member P with the end of a shiftable stop-arm P' (see Figs. 1 and 4).

Stop-arm P' is mounted upon a vertically disposed shaft $p'$ journaled between transverse bars 85 which are fixed to the side plates $a'$. A spring 86 coiled about the lower end of the shaft $p'$ (see Fig. 4) tends to rotate the arm in the direction of the arrow shown in Fig. 1. A perpendicular pin 87 secured to the upper end of the shaft $p'$, but offset therefrom, extends through an arc-shaped guide 88 (see Fig. 1) upon the upper transverse support 85, and is arranged to be engaged by a laterally extending pin 89 fixed to a sleeve 90, which is loosely mounted as shown, upon a horizontally extending rod or arm 91. The inner end of the rod or arm 91 is fixed to a post 92 upon the cross-piece 47' of the selector restoring mechanism while its outer end is arranged to slide through an opening in the end wall of the casing $a$. A spring 93 extending between a collar 94 fixed to the rod 91 and the loose sleeve 90, is of greater strength than the actuating spring 86 of the stop-arm shaft $p'$ and the stop-arm P' is therefore held in normal position with its actuating spring 86 under tension by the engagement of the pins 89 and 87. Sleeve 90 is held against rotation upon the shaft 91 by the engagement of the pin 89 with the slotted bracket 95 fixed to the upper support 85.

A pair of normally closed contact springs 96 are arranged in the energizing circuit of the type wheel magnets O, O' and are mounted upon but insulated from the inner side plate $a$. These contact springs project laterally from the side plate and one of them is provided with an upwardly extending insulated lug 97 (see Fig. 4$^a$). A coöperating bell crank 98 is pivotally mounted upon the side of the collar 94 on restoring-bar 91 and is normally held out of engagement with the insulating lug 97 by a stop-arm 99 fixed to, but insulated from the upper contact bar $g$.

As stated, at the end of any completed signal, latch 50 releases the transverse bar 47' and permits the selected arm G to shift into engagement with either one of the contact bars $g$, thereby closing the contact through either one of the magnets O, O' to shift the type wheel in one or the other direction. At the same time, stop-arm P' is released and is shifted by its spring 86 until the pin $p^2$ upon its inner end engages the selected arm G. The outer end of the stop-arm P' is then in proper position to engage the stop-member P and arrest the type wheel and type wheel shaft in position with the character corresponding to the signal received at the printing point. At the same time, the shift of the arm 91 moves bell crank 98 away from the stop 99 and the latter drops by its own weight into engagement with the stop 100 upon the sleeve 94 and into the position indicated by dotted lines in Fig. 4$^a$. When the signal is completed the transverse bar 47' and arm 91 are actuated by the restoring magnet J, stop-arm P' is restored to normal position against the tension of its actuating spring 86 by the engagement of pin 89 with pin 87 and the energizing circuit through the type wheel operating magnet is opened momentarily by the engagement of the bell crank 98 with the lug 97 upon one of the contact springs 96. The type wheel and its operating mechanism are then free to be restored to normal, central position by the spring 71.

It will be observed that the sleeve 90 loosely mounted on the arm 91 and the spring 93, forms a yielding connection between the restoring devices and the stop-arm P'. During the restoring movement the outer end of the arm P' engages the stop-member P upon the type wheel shaft and if rigid connections were provided between the restoring device and the stop-arm P' the latter would be forcibly held in engagement with the stop-member P, and thereby prevent the restoration of the type wheel to its normal position. By providing yielding connections however, between the restoring devices and the stop-arm P', the latter cannot prevent the return movement of the type wheel after the signal is completed.

The frame whereon the type wheel is carried shifts upon its pivots 68 between adjustable stops 101 and 102, threaded through lugs upon the supporting uprights 69 and arranged to engage the side bars 65 of the frame. The type wheel frame is held in normal position with the side bars in engagement with stops 101 by a locking bell crank $r$, which is pivoted to the inner side plate $a'$ and the horizontal arm of which is arranged to engage a lug 103 upon the type wheel frame. The locking bell crank $r$ is held in normal position by spring 104 with its upper arm against one of the transverse pieces $a^2$. This vertical arm forms the armature of a small magnet R fixed to the inner plate $a'$, which is arranged to shift the locking bell crank and release the type wheel frame. The energizing circuit of magnet R is arranged to be closed by the engagement of stop-member P with the insulated end-portion of the stop-arm P'.

It will be observed that the pins 80, to which the operating links 79 are connected, are on opposite sides of the pivot shaft 76, but are on the same side of the pivot of the type wheel supporting frame. The shift of the links 79 effected by the magnets O, O' first serves to rotate the type wheel in one or the other direction until arrested with the selected type at the printing point by the engagement of the stop-member P with the stop-arm P'. The circuit through magnet R is then closed and the locking arm $r$ shifted to release the printing frame. A further pull upon either of the arms 79 will then shift the printing frame in the direction of the arrow shown in Fig. 5, to move the selected type against a platen $n'$. During this shift, if the pull is on the upper link 79, the pin 80 on the lower end of the segment arm 75 will slide laterally in the slot of the lowermost link 79, but if the pull is on the lowermost arm the upper pin 80 will slide laterally in the slot of the upper link 79. The shifting type wheel frame is restored to normal position into reëngagement with the locking bell crank $r$ by a laterally off-set arm 105 fixed to the restoring rod 91 and arranged to engage a vertically projecting arm 106 fixed to one of the side bars 65 of the shifting frame.

To accurately aline the printed characters the selected type is centered at the printing point by a pointed pin 107 fixed to and normally projecting from the face of the casing $a$ which coöperates with a series of holes 108 in a cylindrical portion 109 on the type wheel shaft. This cylindrical portion 109 is conveniently formed in one piece with the stop-member P' as shown. The holes 108 correspond in number and position with the type upon the wheel N and as the frame and type wheel are shifted toward the platen $n'$ to effect the impression, the centering pin 107 engages one of the holes 108 and accurately alines the selected type.

The transverse platen $n'$ is faced with rubber or other suitable material and is mounted between a pair of uprights 110 secured at their lower ends to the supports 69. The paper (see Fig. 2) is conveniently carried upon a roll 111 journaled beneath the base plate, and passes upwardly therefrom between a pair of feed rollers 112 and 113 and between the platen $n'$ and the type wheel N. Below the feed rollers 112 and 113 the paper passes over a spring-held guide roller 114 and above the feed rollers the paper passes between vertically disposed guide plates 115 fixed to the uprights 110. Feed rollers 112 and 113 are covered with rubber or other suitable material and feed roller 112 is fixed in position while roller 113 is held between a pair of spring-actuated arms 116 so as to securely grip the paper. A pair of spring arms 117 fixed to the hub of the type wheel, carry inking rollers 118 of absorbent material which engage and ink the type.

The type wheel is moved step by step after the successive impressions, and for this purpose a shifter 119 is provided, the upper end of which engages a slotted collar 120 upon the hub of the type wheel. The shifter 119 is mounted to slide upon the transverse guide rod 67 and its lower end is secured to a slide 121 mounted upon the guide rod 66. Cords 122 connect the shifter 119 with the drums 123 and 124 at opposite sides of the machine. These drums are rotatably mounted upon brackets 125 and the drum 123 is actuated by a coiled driving spring 126. A ratchet 127, fixed to the drum 124 (see Fig. 8ª) is arranged to be engaged by a pawl 128 pivotally mounted upon the end of a bell crank $s'$. Bell crank $s'$ is pivoted to the adjacent bracket 125 and its downwardly extending arm forms the armature of a magnet S. Pawl 128 is normally held out of engagement with ratchet 127 by its engagement with a stop 129, but when magnet S is energized it shifts the pawl 128 away from stop 129 into engagement with the teeth of ratchet 127, and drum 124 is shifted to move the type wheel shifter 119 and type wheel N against the tension of spring 126 the distance of one letter-space. A locking pawl 130 pivoted to the bracket 125 is arranged to engage the teeth of ratchet 127 and hold the type wheel in shifted postion. The energizing circuit of the letter-space magnet S is controlled by a contact spring 131 mounted upon the restoring bar F (see Figs. 6 and 9) and arranged to engage an insulated contact 132 when the restoring bar F is shifted. The circuit through the restoring magnets F' and J is closed by the engagement of a contact arm 133 on the type wheel printing frame with an insulated contact 134 (see Figs. 7 and 9), whenever the printing frame is shifted to effect an impression.

A pinion 135 (see Fig. 8ª) connected to the shaft of drum 124 is arranged to drive a gear 136 fixed to the shaft of the ratchet locking pawl 130. This pawl is provided with a V-shaped projection 137 and is arranged to be held either into or out of engagement with the ratchet 127 by a spring-held roller 138. At the end of the forward movement of the type wheel, a pin 139 upon the gear 136 engages the pawl 130 and shifts it to release the ratchet 127. The actuating spring 126 is then free to shift the type wheel in reverse direction into position to commence a new line. At the end of this restoring movement a pin 140 upon the gear 136, engages the pawl 130 and restores it into engagement with the ratchet 127.

The line space feed of the paper is effected by a feed pawl 141 (see Fig. 8) arranged to engage the teeth of a ratchet 142 fixed to the shaft $112^a$ of the roller 112. Pawl 141 is pivotally mounted upon the end of a shifter-bar 143, which in turn is pivoted to an upright 144 on the base plate A. An actuating magnet T is fitted to an upright 145 on the base plate A and is provided with laterally extending poles coöperating with an armature $t$, mounted upon the line space feed-arm 143. In normal position, pawl 141 is held out of engagement with the teeth of ratchet 142 by a stop 146 with which the tail of the pawl engages. As arm 143 shifts, a spring 147 connected thereto and engaging the tail of the pawl 141 moves the latter into engagement with the teeth of ratchet 142 and the feed roller 112 is thereby shifted to move the paper one line space. The energizing circuit of the magnet T is closed by the engagement of the tail-piece of pawl 130 with an insulated contact 148 whenever the pawl is shifted.

Pawl 130, as stated is shifted by the pin 139 whenever the type wheel N reaches the end of its forward traverse. It may also be shifted by a pivoted arm 149 arranged to engage the tail of the pawl 130 and connected at its lower end to a rod 150. Rod 150 slides through openings in the upright 69 (see Figs. 7, $8^a$ and $8^b$) and is held in normal position by a spring 151 coiled about the end of the rod and extending between one of the uprights 69 and an abutment 152 thereof. A swinging arm $w$ hung on the shaft of the drum 123, is provided with an adjustable screw 160 at its lower end arranged to engage the abutment 152 upon the end of the rod 150. Arm $w$ forms the armature of a small magnet W so that when the latter is energized, rod 150 is actuated against the tension of spring 151 to shift pawl 130 and thereby effect the return of the type wheel and the line space feed of the paper, as above described.

The letter-space feed magnet S, the type wheel return magnet W and the letter-space feed magnet T may each be energized by the transmission of special signals over the line. For this purpose, the contact bars $g$ (see Figs. 1 and 5) are provided with special insulated contact strips 161 of which there are three as indicated in Fig. 9, which control the circuits respectively of the three magnets S, T and W. By the transmission of special signals over the line, the arms G coöperating with the special contacts 161 may be actuated to operate the letter-space feed, type wheel return or line-space feed, as desired. By the operation of the letter-space feed in this manner, spaces are left between the printed words.

The operating circuits are diagrammatically indicated in Fig. 9. The line circuit 162 passes through the reversal wound coils of the polarized line relay K to the ground, or a return line circuit normally passes through the relay K in such direction that its armature $k$ is held in engagement with the contact 60. In this position a circuit is closed from local battery 163 by wire 164, armature $k$ and contact 60, to conductor 165, through the coil of magnet L, thence by conductor 166 through the coil of one of the spools $b'$, thence by conductors 167 and 168 through the coil of spool $b^3$ and back to battery by conductor 169. Armature $b'$ is thus held in normal position with dog 17 on the anchor C' holding the escapement member C and selector controller E in normal position, and armature $l$ is held up against the tension of spring 63 into engagement with contact 62.

At each complete line impulse, the current on the line circuit is reversed and again restored to normal condition. At each reversal from normal condition armature $k$ of line relay K is shifted into engagement with contact 61 and the local circuit through magnet L and one of the spools $b'$ is opened. Current from local battery 163 is then closed by conductor 164, armature $k$, contact 61, conductor 170, through the other spool $b'$, thence by conductors 171, 168 and 169 through the spool $b^3$ back to battery. This shifts the escapement and selector controller E one-half step and permits the shift of the first selector bar. In either position of the armature $k$, the local circuit is always closed from the same direction through the electromagnet $b^3$, so that the armature $b^2$ is always properly polarized. If desired, the line relay K could be arranged to alternately reverse the flow of current from local battery 163 through the coils of spools $b'$. At the end of the complete impulse, the armatures $k$ and $b^2$ are returned to normal position and the step movement of the escapement and controller E is completed, the slot in controller E moving to a position half-way between the first and second bars D. The succeeding impulses of the code combinations successively bring the slot and the controller E into line with one or more of the selector bars D to effect their shift in accordance with the varied number of impulses in the different code combinations representing the several signals or characters. If the reversal from normal on the line is short or a "dot," armatures k and $b^2$ of the relays K and B are held momentarily in shifted position and a single tooth only on the particular selector bar actuated by the impulse passing through the slot in the selected controller. But if the line reversal is prolonged or a "dash", both teeth on the actuated selector bar pass through the slot. In this manner one or more of the selector bars is shifted in accordance with the number of impulses in the given code combination and are shifted to different positions in accordance with the varied lengths of the impulses and for any given combination a row of slots upon the several selector bars D is opened on line with one of the signal-making arms G. It should be noted that the "dot" movement and the longer "dash" movement of the several selector bars should be so arranged that the sum of the "dot" movement plus the additional shift effected by the "dash", should not be equal to the spaces between the arms G or any multiple thereof, otherwise rows of slots will be opened in line with more than one of the arms G.

The operating circuits for the selectively controlled apparatus and printing mechanism, derive current from a local battery 172 connected on one side to a power wire 173 indicated in the diagram by a heavy line, and on the other side to the frame of the machine indicated by dotted lines 174.

As stated, in normal condition armature l of magnet L is held against contact 62 and current may be traced from battery by power wire 173 to armature l and contact 62 to conductor 175, through the trip magnet H, and back by return conductor 174 to the battery. Magnet H is thus normally energized, its armature h and trip 52 held in the position indicated with the pawl 54 on lock 50 engaging the end of the trip, as shown. At the first line impulse the energizing circuit of magnet L is open, armature l falls away from contact 62 opening the circuit of magnet H. Trip 52 is drawn back by its spring and pawl 54 swings above the upper edge thereof. As the signal is received, the impulses are timed by variably holding the armature k against contact 61 and the armature only momentarily engages contact 60 and is not brought to rest until the end of the completed signal. The circuit through magnet L is thus momentarily closed as the signal is received, but the tension of spring 63 on armature l is such that the armature will not be drawn up except at the pauses between the completed code combinations when as stated, armature k is brought to rest on contact 60. At this time the energizing circuit of magnet H is closed to effect the operation of the selectively controlled apparatus and the restoration of parts to normal position. This operation thus takes place at the pauses between completed signals, irrespective of the number of impulses in the different combinations. Armature h and trip 52 are then drawn up, latch 50 is disengaged from the transverse restoring bar 47' and the selected arm G is permitted to shift into engagement with either one of the contact bars g. At the end of this movement, pawl 54 strikes the stop 58 and is released from the trip 52 so that latch 50 is shifted into position in readiness to reëngage the transverse bar 47'. Moreover, magnet H and bell crank 52 are also in position to again trip latch 50 at the next succeeding operation. As soon as the selected arm G engages one of the contact bars g, current may be traced from battery by power wire 173, conductor 176 through the normally closed contact 96 to conductor 177, thence through one or the other of the trip-adjusting magnet O or O', by conductor 178, or 179 to one of the bars g and to the selected arm G, and thence through the metal of the machine back to battery. The type wheel is then rotated in one or the other direction from normal by a pull upon one or the other of the links 79.

When the bar 47 is released from latch 50, the stop arm P' is also released and shifts until the pin $p^2$ upon the end thereof engages the selected arm G. The opposite end of the stop arm P' is then in position to so engage the double helical stop-member P and arrest the type corresponding to the signal received in printing position. When stop-member P engages the insulated end of stop-arm P', the circuit is closed from power wire 173 through the small magnet R by conductor 180 to the insulated end of stop-arm P' to stop-member P and through the metal of the machine back to battery. The lock r is then shifted to release the type wheel frame and the further pull of one of the links 79 shifts the type wheel frame and type wheel laterally to make the impression of a selected type upon the paper. The shift of the type wheel frame brings arm 133 into engagement with contact 134 and a circuit is closed from battery by power wire 173 through magnet M, thence by conductors 180, 181 and 182 to contact 134 and then by arm 133 through the metal of the machine back to battery. The restoring circuit controller m is then shifted into engagement with contact 64 and a circuit is closed from power wire 173 through the locking magnet M', conductor 183 to contact 64 and circuit controller m, thence by conductor 184 to the branch conductors 185 and 186, through the coils of both restoring magnets F' and J, thence by the branch conductors 187 and 188 to the conductor 189 and to the normally closed contacts 45 and 43, thence back through the metal of the machine which forms the return conductor 174 back to battery. By energizing the additional locking magnet M′, the restoring circuit is held in locked condition after the contact arm 133 breaks engagement with contact 134 and until the parts are completely returned to normal position.

When restoring magnet J is energized the restoring bar 47′ is drawn up into reëngagement with the lock 50. The engagement of the restoring bar 47′ with the tail pieces of the arms G restores them to normal position and disengages the selected arm from the selector bars D. At the same time the shift of the restoring bar 91, connected to the cross bar  momentarily disengages the contact 96 and opens the circuit through the type-operating magnets O, O′ so that the type wheel and frame are released. The type wheel is restored to normal, central position by its spring 71 and the frame is restored by the engagement of the arm 105 on restoring bar 91 with the arm 106 on the frame, as described. The shift of the restoring bar 91 also returns stop arm P′ to normal position.

The operation of the restoring magnet F′ through the medium of shifter 35 and restoring bar F, effects the return of the escapement C, C′, controller E and selector bars D to normal position, as previously described, and brings contact 131 into engagement with the contacts 132. The circuit is then closed from power wire 173 through the letter-space magnet S, thence by conductor 190 to contacts 132 and 131 back to battery through the metal of the machine. The type wheel frame is thereby shifted one step in letter-space direction to record the succeeding character. At the end of the shift of the restoring bar F stop 47 thereon disengages contacts 43 and 45 and opens the restoring circuit through magnets F′ and J and locking magnet M. The parts controlled thereby are then returned by their actuating springs to the normal position in readiness to effect the succeeding operation.

As stated, special signals may be transmitted over the line to shift any one of three special arms G into engagement with one of the three special insulated contacts 161. When an arm is selected to engage the lowermost contact 161, shown in Fig. 9, a circuit is closed from power wire 173 through the coil of magnet M and thence by conductors 180, 181 and 191 to the selected contact 161 and selected arm G, back to battery through the metal of the machine. The restoring circuit controller m is drawn up as before, restoring bar F is actuated to close contacts 131 and 132 and thereby energize the letter-space magnet S to shift the type wheel frame one space without printing. This special signal properly spaces the words of the message. When the arm G corresponding to the center contact 161 is selected, the circuit is traced from power wire 173 through the coil of line-space magnet T, by conductor 192 to the selected contact 161 and selected arm G and back as before through the metal of the machine to battery and the line-space magnet is actuated. At the same time a circuit is closed through the magnet M which controls the restoring circuit as follows: from power wire 173 to the coil of the magnet and by conductors 184, 193 and 192 to the selected contact 161, so that the parts are restored to normal position as before. The engagement of the arm G corresponding to the upper contact 161 closes the circuit from power wire 173 through the type wheel return magnet W and thence by a conductor 194 to the selected contact 161 and back through the metal of the machine to the battery. The carriage is then automatically returned as above described, to commence a new line. At the same time the restoring circuit is closed by the operation of the magnet M, the circuit of which is closed from power wire 173 to the coil of the magnet and by conductors 180, 195 and 194 to the contact and back to battery as before. Resistance coils 196 are preferably interposed in the several return conductors 181, 193 and 195 leading from the magnet M which controls the restoring circuit so that when any one of these circuits is closed neither of the others will be energized. The carriage return and line-space mechanism are also automatically operated by the engagement of pins 139 with the pawl 130 (see Fig. 8ᵃ) which permits the return of the type wheel to normal position by the spring 126 as described, and also closes the circuit through the line-space magnet when pawl 130 engages contact 138. This circuit is closed as follows: from power wire 173 through the line-space magnet T to conductors 192 and 197 to contact 148, pawl 130 and back to battery through the metal of the machine. Magnet T is therefore energized to shift the paper one line-space whenever the type wheel return is actuated by the machine or by the transmission of a special signal over the line. The line-space itself may be separately actuated, if desired by a special signal.

The circuit is thrown into the machine by switches 198 and 199 located in the line 162 and in the local conductor 169. When these switches are open armatures 1 and trip 52 are of course drawn away from the normally energized magnets L and H and the trip is in position to release the transverse bar 47′. When the current is thrown into the machine by closing the switches 198 and 199, trip 50 is actuated to release bar 47′ and the stop-arm P' so that the machine is not then ready to receive the message. As none of the selectors are actuated, stop-arm P' moves over to the extreme end of its traverse and engages the contact 200 located on the side plate a', as shown in Fig. 5. The energizing circuit through the magnet M is then closed from power wire 173, conductors 180 and 201 to the contact 200 and back to battery through the metal of the machine so the restoring mechanism is actuated as before, to return the transverse bar 47 into reëngagement with the latch 50 and to return the stop-arm P' to normal position.

An arrangement by which the selective system and apparatus may be employed to effect the operation of a typewriter, typesetting or other key-board machine in which the parts to be operated are independently mounted, is diagrammatically illustrated in Fig. 10. In this modification the arrangement of the line relay, selector controlling relay, selective apparatus, restoring relays and circuits is like that previously described. The contact bars y' in this form are preferably of insulating material and provided with a series of individual contacts $g^2$ (see Fig. 10ᴬ) which correspond in number with and coöperate with the signal-making switch arms G. Arms G are selectively controlled by the operation of the selector bars as previously described. The number of arms G and coöperating contacts $g^2$ correspond with the number of characters or signals to be transmitted and a similar number of actuating magnets Y are provided, the pivoted armatures y of which are arranged to effect the operation of a series of independently mounted type bars y' of an ordinary typewriter. Only two of these magnets are shown but it will be understood that the remainder are similarly arranged. When any one of the arms G is shifted into engagement with its contact $g^2$, a circuit is closed from the power wire 173 through magnet M, conductor 202 and through one of a set of branch conductors 203 to the coils of one of the magnets Y and to the selected contact $g^2$ by one of a series of conductors 204, thence to the shifted arm G and back to battery through the metal of the machine. It will be understood that the several magnets Y are all connected on one side by branches 203 to the conductor 202 and on the other side by sets of branches 204 to their respective contacts $g^2$. In this manner the type bars y' may be selectively operated. At each operation the circuit is closed as described through the magnet M, and the restoring circuit controller m is shifted into engagement with contact 64 to close the restoring circuit which operates as previously described in connection with the arrangement shown in Fig. 9.

It is obvious that numerous changes could be made in the details of structure and arrangement of parts and circuits without departure from the invention and that portions thereof could be employed without its adoption in entirety.

While the long and short impulses of the "dot" and "dash" code are preferably employed, the selector controlling relay could be arranged to respond to line impulses otherwise modified.

Having described my invention, what I claim as new and desire to secure by Letters Patent, is:—

1. In an electric selective system in which the signals are represented by different numbers of successive, modified impulses, a series of independently shiftable selectors and controlling means therefor arranged to be brought successively into operative relation with one or more of said selectors in response to the varied number of impulses in the different code combinations and arranged to effect the shift of said selectors in response to the varied order of the modified impulses.

2. In an electric selective system in which the signals are represented by different numbers of impulses of different lengths, a series of independently shiftable selectors, a main line circuit and selector controlling means arranged to be brought successively into operative relation with one or more of said selectors to effect the shift thereof in accordance with the different lengths of the succeeding main line impulses.

3. In an electric selective system in which the signals are represented by different numbers of successive, modified impulses, a series of independently shiftable selectors and an electrically-operated step-by-step controller common to all of said selectors acting in response both to the varied number and varied order of impulses in the different code combinations for effecting the shift of said selectors.

4. In an electric selective system in which the signals are represented by different numbers of successive, modified impulses, a series of independently shiftable selectors, means for controlling the shift of said selectors and a relay acting in response both to the varied number and varied order of impulses in the different code combinations arranged to directly and variably actuate said selector-controlling means.

5. In an electric selective system in which the signals are represented by different numbers of successive, modified impulses, a series of independently shiftable selectors, a main line circuit, a step-by-step controller common to all of said selectors and an operating relay therefor acting in response both to the varied number and varied order of main line impulses in the different code combinations for variably actuating said controller, and a series of independently shiftable devices controlled by the combined operation of said selectors.

6. In an electric selective system in which the signals are represented by different numbers of successive, modified impulses, a series of independently shiftable selectors, selector controlling-means and electrically operated step-by-step mechanism for bringing said controlling means successively into operative relation with one or more of said selectors in response to the varied number of impulses in the different code combinations to effect the shift thereof in accordance with the varied order of the modified impulses.

7. In an electric selective system in which the signals are represented by different numbers of impulses of varied lengths, a series of independently shiftable selectors, a common step-by-step controller acting in response both to the varied number and varied lengths of the impulses in the different code combinations for effecting the variable operation of said selectors.

8. In an electric selective system in which the signals are represented by different numbers of modified impulses, a controlling device, a single line circuit, a relay acting in response both to the varied number and order of the modified line impulses in the different code combinations and arranged to variably actuate said controller step-by-step to one or more positions and to variably hold said controller in such positions and selector mechanism governed by said controller.

9. In an electric selective system in which the signals are represented by different numbers of modified impulses, a controlling device, a single line circuit, a relay acting in response both to the varied number and varied order of line impulses in the different code combinations to shift said controlling device step-by-step to one or more positions and to variably hold the same in such positions, a series of independently shiftable selectors governed by said controlling device and a series of shiftable devices, the operation of any one of which is effected by the combined operation of said selectors.

10. In an electric selective system, a series of independently shiftable selectors, mechanism common to all of said selectors directly and mechanically controlling the shift thereof, a main line circuit and a line relay controlled by the impulses passing over the circuit directly actuating said selector controlling mechanism.

11. In an electric selective system, a series of selectors, each independently shiftable from normal to a plurality of different positions, a main line circuit and a common step-by-step controller acting in response to the modified main line impulses arranged to control the variable shift of said selectors.

12. In an electric selective system in which the signals are represented by different numbers of modified impulses, a series of selectors, each independently shiftable from normal to a number of different positions, a single line circuit, and controlling means common to all of said selectors and acting in response to the varied number of impulses in the different code combinations for successively shifting one or more of said selectors and acting in response to the varied order of the modified impulses for effecting the shift of the several selectors to different extents.

13. In an electric selective system, a main line circuit, a series of selectors, each independently shiftable from normal to a number of different positions, and controlling means common to all of said selectors and successively brought into operative relation with said selectors to effect the variable shift thereof, the extent of shift of each of said selectors being varied by prolonging or otherwise modifying the main line impulses.

14. In an automatic telegraph system in which the characters or signals are represented by different numbers of variably modified impulses, a series of independently shiftable selectors, a common step-by-step controller actuated by and in response both to the varied number and varied order of the impulses in the different code combinations to shift one or more of said selectors, and means controlled by said selectors to make the signal.

15. In an automatic telegraph system in which the characters or signals are represented by different numbers of variably modified impulses, a series of independently shiftable selectors, a main line circuit, controlling means brought successively into operative relation with one or more of said selectors in response to the varied number of impulses in the different code combinations and arranged to effect the variable shift thereof in response to the varied order of the modified impulses and means controlled by the combined operation of said selectors to make the signal.

16. In an automatic telegraph system in which the signals are represented by different numbers of variably timed impulses, a series of independently and variably shiftable selectors, a main line circuit, selector controlling means brought successively into operative relation with one or more of said selectors in response to the varied number of line impulses in the different code combinations and arranged to effect the variable shift of said selectors in response to the varied lengths of the impulses and type mechanism controlled by said selectors.

17. In an automatic telegraph system in which the characters are represented by different numbers of variably modified impulses, a series of independently shiftable selectors, a common step-by-step controller therefor, a main line circuit, a relay acting in response both to the varied number and varied order of main line impulses in the different code combinations to variably actuate said selector controller and type-mechanism controlled by the combined operation of said selectors.

18. In an automatic telegraph system in which the characters are represented by different numbers of variably modified impulses, a series of independently shiftable selectors, a main line circuit, a common step-by-step controller therefor actuated by and in response both to the varied number and order of main line impulses in the different code combinations to shift one or more of said selectors and a series of independently shiftable signal-making devices controlled by the combined operation of said selectors.

19. In an automatic telegraph system in which the signals are represented by different numbers of variably timed impulses, a series of independently shiftable selectors, a common controller therefor, a step-by-step actuating mechanism for said controller, a main line circuit, a relay actuated by and in response to the varied number of main line impulses to shift said step-by-step mechanism and said controller into different positions and into successively operative relation with one or more of said selectors and acting in accordance with the varied lengths of the impulses to variably hold said controller in such position to effect the variable shift of said selectors, means controlled by said selectors to make the signal and restoring means controlled by the combinations of impulses received and acting at the pauses between completed code combinations.

20. In an automatic telegraph system in which the signals are represented by different numbers of variably modified impulses, a series of independently shiftable selectors, a main line circuit, a common step-by-step controller for all of said selectors actuated by and in response both to the varied number and varied order of main line impulses and a series of independently shiftable signal-making devices controlled by the combined operation of said selectors.

21. In an automatic telegraph system in which the characters are represented by different numbers of modified impulses, a series of independently shiftable selectors, a main line circuit, a step-by-step controller common to all of said selectors acting in response to the succeeding main line impulses and arranged to variably shift the same by prolonging or otherwise modifying the main line impulses, signal-making means controlled by the combined operation of said selectors and means controlled by the combination of impulses received for preventing the operation of said signal making means, except at the pauses between completed code combinations.

22. In an automatic telegraph system, a series of selectors, each independently shiftable from normal to a number of different positions, a main line circuit, a common step-by-step controller acting in response both to the varied number and varied order of the main line impulses to effect the variable shift of said selectors and signal-making means controlled by said selectors.

23. In an automatic telegraph system, a main line circuit, a series of selectors, each independently shiftable from normal to a number of different positions, controlling means actuated in response to the main line impulses into operative relation successively with said selectors to variably shift the same, the extent of shift of said selectors being varied by prolonging or otherwise modifying the main line impulses and type mechanism controlled by said selectors.

24. In an automatic telegraph system, a series of selectors, each movable from normal to one of two positions, a main line circuit, common controlling means therefor acting in response to succeeding line impulses for successively shifting said selectors from normal and to one or another position in response to the varied order of the modified line impulses, and means controlled by said selectors to make the signal.

25. In an automatic telegraph system in which the signals are represented by different numbers of variably modified impulses, a selector mechanism, a main line circuit, a relay and selector controlling mechanism acting in response both to the varied order and varied number of main line impulses, signal-making means controlled by said selector mechanism and restoring means controlled by the main line impulses and acting at the pauses between completed code combinations.

26. In an automatic telegraph system in which the characters are represented by different numbers of variably timed impulses, a series of type, mechanism for selectively controlling said type, a main line circuit, a single relay acting in response both to the varied number and varied order of the main line impulses in the different code combinations arranged to directly and variably actuate said controlling means and means controlled by said line circuit and arranged to be varied by all impulses received for preventing the operation of the selected type except at the pauses between completed code combinations.

27. In an automatic telegraph system in which the signals are represented by different numbers of variably modified impulses, a series of independently shiftable selectors, a main line circuit, controlling means common to all of said selectors and actuated by and in response both to the varied number and order of the main line impulses to successively and variably shift one or more of said selectors, type mechanism controlled by said selectors and means controlled by the combinations of main line impulses received arranged to effect the operation of said type mechanism at the pauses between completed code combinations.

28. In an automatic telegraph system in which the signals are represented by different numbers of variably modified impulses, a series of independently shiftable selectors, a main line circuit, controlling means common to all of said selectors and acting in response both to the varied number and order of the main line impulses to successively and variably shift one or more of said selectors, type of mechanism controlled by said selectors, restoring devices and means controlled by the combination of main line impulses received arranged to effect the operation of the restoring devices at the pauses between completed code combinations.

29. In an automatic telegraph system in which the signals are represented by different numbers of variably modified impulses, a series of independently shiftable selectors, a main line circuit, controlling means common to all of said selectors and acting in response both to the varied number and order of the main line impulses to successively and variably shift one or more of said selectors, type mechanism controlled by said selectors, restoring devices, electric operating circuits for said type mechanism and said restoring devices, and electrical means controlled by said line circuit for preventing the completion of said operating circuits, except at the pauses between completed code combinations.

30. In an electric selective apparatus, a series of independently shiftable selectors, a common controller therefor, a step-by-step device for variably shifting said controller in one direction from normal successively into operative relation with one or more of said selectors and restoring means for shifting said controller in the opposite direction to normal.

31. In an electric selective apparatus, a series of independently shiftable selectors, a common controller therefor, a step-by-step device and an operating relay acting to variably shift said controller step-by-step to one or more positions and to variably hold said controller in such positions to effect the variable shift of one or more of said selectors, restoring means for said selectors and said controller.

32. In an electric selective apparatus, a series of independently shiftable selectors, a stationary relay and mechanical controlling connections between the armature of said relay and said selectors.

33. In an electric selective apparatus, a series of independently shiftable selectors, a common step-by-step mechanism directly and mechanically controlling the variable shift of all of said selectors and electric operating means for said step-by-step mechanism.

34. In an electric selective apparatus, a series of independently shiftable selectors, a spring-actuated controller mechanically effecting the variable shift of said selectors, an escapement for effecting the shift of said controller and means for actuating said escapement.

35. In an electric selective apparatus, a series of independently shiftable selectors, actuating springs for said selectors, stops on each of said selectors, a common controller coöperating with said stops to variably effect the shift of said selectors and means for actuating said controller.

36. In an electric selective apparatus, a series of spring-actuated selectors, plural stops on each of said selectors, a controller coöperating with said stops and having a slot arranged to be brought successively in line with stops on the several selectors to permit the passage of one or more of said stops therethrough and thereby effect the variable shift of said selectors and means for actuating said controller.

37. In an electric selective apparatus, a series of selectors each independently shiftable from normal to a number of different positions, common controlling means for effecting the variable shift of said selectors, a set of independently movable signal-making devices controlled by said selectors, and a common type wheel controlled by the combined operation of said signal making devices.

38. In an electric selective apparatus, a series of selectors each independently shiftable from normal to a number of different positions, a common controller for said selectors and a relay for variably actuating said controller in response to the variably modified code impulses.

39. In an electric selective apparatus, a series of selectors each independently shiftable from normal to a number of different positions, a common controller for said selectors, a step-by-step device for actuating said controller and a relay arranged to variably operate said step-by-step device and said controller in response to the successive, variably timed impulses.

40. In an electric selective apparatus, a series of selectors each independently shiftable from normal to a number of different positions, a common controller therefor, and means arranged to shift said controller to a number of different positions and to variably hold the same in such positions to effect the variable shift of said selectors.

41. In an electric selective apparatus, a series of selectors each independently shiftable from normal to a number of different positions, a controlling relay therefor and mechanical devices interposed between the armature of said relay and said selectors for effecting the successive and variable shift of said selectors.

42. In an electric selective apparatus, a series of selectors each independently shiftable from normal to a number of different positions, actuating springs for said selectors, a plurality of stops on each of said selectors, a common controller coöperating with said stops and means for successively and variably shifting said controller to permit the successive and variable shift of said selectors.

43. In an automatic telegraph system in which the characters are represented by different numbers of modified impulses, a series of selectors, each independently shiftable from normal to a number of different positions, a main line circuit, controlling means acting in response both to the varied number and varied order of the main line impulses for variably shifting one or more of said selectors and a series of type controlled by said selectors.

44. In an automatic telegraph system in which the characters are represented by different numbers of variably timed impulses, a series of selectors, each independently shiftable from normal to a plurality of different positions, a main line circuit and controlling means brought in response to the varied number of main line impulses in the different code combinations into operative relation with one or more of said selectors, and to variably effect the shift thereof to different extents in response to the varied lengths of the impulses, and type mechanism controlled by said selectors.

45. In an automatic telegraph system in which the signals are represented by successive, variably modified impulses, a series of selectors, each independently shiftable to a plurality of different positions, a main line circuit, controlling mechanism acting in response to the successive line impulses for successively shifting said selectors, the extent of shift of the several selectors being varied by prolonging or otherwise modifying the main line impulse and a series of type controlled by said selectors.

46. In automatic telegraphs, a series of independently shiftable selectors, a controller mechanically effecting the shift of all of said selectors, electrical means acting in response to modified code impulses for variably actuating said controller and a series of type controlled by said selectors.

47. In automatic telegraphs, a series of independently shiftable selectors, a relay, mechanical controlling connectors between the armature of said relay and said selectors arranged to effect the variable shift thereof, and a series of type controlled by said selectors.

48. In automatic telegraphs, a series of independently shiftable selectors, a common step-by-step controlling mechanism directly and mechanically controlling the variable shift of said selectors, a relay arranged to variably actuate said step-by-step mechanism in response to the modified code impulses, and a series of independently shiftable type controlling devices controlled by the combined operation of said selectors.

49. In automatic telegraphs, a series of independently shiftable selectors, actuating springs for said selectors, stops on said selectors, a common controller coöperating with said stops, a relay acting in response to the modified code impulses for variably actuating said controller to effect the variable shift of said selectors and a series of type operatively controlled by said selectors.

50. In automatic telegraphs, a series of selectors, each independently shiftable from normal to a plurality of different positions, a common step-by-step controller for said selectors, an operating relay therefor acting in response to the modified code impulse for shifting one or more of said selectors and to variable extents and a series of type-controlling devices controlled by said selectors.

51. In automatic telegraphs, a series of selectors, each independently shiftable from normal to one or two positions, a common, electrically operated controller for said selectors arranged to effect the successive shift of one or more of said selectors and to one or another position in response to succeeding variably timed impulses and a series of type controlled by said selectors.

52. In automatic telegraphs, a series of selectors, each independently shiftable to one of two positions, a mechanical controller therefor, a step-by-step mechanism and a relay for successively and variably actuating said controller to successively effect the shift of one or more of said selectors, each to one or another position and a set of type selectively controlled by said selectors.

53. In automatic telegraph systems in which the characters are represented by different numbers of variably modified impulses, a series of independently shiftable selectors, a common step-by-step controller for said selectors acting in response to the succeeding code impulses, a set of type controlled by said selectors and means controlled by the impulses received arranged to effect the operation of the selected type at the pauses between completed code combinations.

54. In automatic telegraph systems in which the characters are represented by different numbers of variably modified impulses, a series of independently shiftable selectors, a common step-by-step controller for said selectors acting in response to the succeeding code impulses, a set of type controlled by said selectors, means controlled by the impulses received arranged to effect the operation of the selected type at the pauses between completed code combinations and restoring means controlled by the operation of said type.

55. In automatic telegraph systems in which the signals are represented by different numbers of variably modified impulses, a relay, a step-by-step controller actuated by said relay in response to the varied number of main line impulses, a series of selectors arranged to be variably shifted by said controller by prolonging or otherwise modifying the main line impulses, a set of type controlled by said selectors, and means controlled by the line impulses for effecting the operation of the selected type at the pauses between completed code combinations.

56. In automatic telegraphs in which the signals are represented by different numbers of variably modified impulses, a line circuit, a relay controlled thereby, a step-by-step controller variably actuated by said relay in response to the varied number and order of the impulses in the different code-combinations, a series of selectors variably shifted by said controller, a set of type controlled by said selectors, means controlling the operation of the selected type, an operating circuit therefor, a switch in said circuit and a magnet traversed by all impulses received arranged to open said switch at the first of each combination and close the same at the pauses between completed combinations.

57. In automatic telegraphs in which the signals are represented by different numbers of variably modified impulses, a line circuit, a relay controlled thereby, a step-by-step controller variably actuated by said relay in response to the varied number and order of the impulses in the different code-combinations, a series of selectors variably shifted by said controller, a set of type controlled by said selectors, means controlling the operation of the selected type, an operating circuit therefor, a switch in said circuit, a magnet traversed by all impulses received arranged to be opened at the first impulse of each combination and closed at the pauses between completed combinations, restoring devices and an energizing circuit therefor controlled by the operation of said type.

58. In automatic telegraphs in which the signals are represented by different numbers of variably modified impulses, a step-by-step controller, a relay acting in response both to the varied number and order of the main line impulses for variably actuating said controller, selector mechanism arranged to be variably shifted by said controller, a set of type controlled by said selector mechanism and means acting at the pauses between completed code-combinations for effecting the operation of the selected type.

59. In automatic telegraphs, a series of shiftable selectors, a common step-by-step controller therefor, a set of signal-making switches controlled by said selectors, a retainer-bar for holding said switches out of operation, a latch for said retainer-bar and a trip for said latch.

60. In automatic telegraphs, a series of spring-actuated selectors, stops on said selectors, a common step-by-step controller coöperating with said stops to effect the shift of said selectors, type mechanism controlled by said selectors and restoring means arranged to successively shift said controllers out of engagement with said stops and return said selectors to normal position.

61. In automatic telegraphs, a type-carrier, a single spring holding said type-carrier in central position, means for shifting the same in opposite directions from normal, stop devices controlling the extent of shift of said type-carrier and selector mechanism controlling said stop devices.

62. In automatic telegraphs, a type-wheel, a double helical cam connected to said type-wheel, a spring engaging said cam in central position and means for shifting said wheel in opposite directions from normal.

63. In automatic telegraphs, a type-wheel, spring mechanism for yieldingly holding said type-wheel in normal position, a double helical stop member connected to said type-wheel, means for shifting the same in opposite directions from normal, a shiftable stop coöperating with said stop member for controlling the shift of said type-wheel and selector mechanism controlling the shift of said stop.

64. In automatic telegraphs, a type-wheel yieldingly held in normal position, means for shifting said wheel in opposite directions from normal, a double helical, stepped stop-member connected to said type-wheel, a shiftable stop-arm coöperating with said stop-member controlling the shift of said type-wheel, a set of shiftable arms controlling said type-wheel actuating devices and controlling the shift of said stop-arm and selector mechanism controlling said set of shiftable arms.

65. In automatic telegraphs, a type-carrier, a shiftable support whereon said type-carrier is mounted and common means for shifting said type-carrier in different directions to bring the selected type to the printing point and for shifting said support to effect the impression of the selected type.

66. In automatic telegraphs, a type-wheel yieldingly held in normal position, a shiftable support whereon said type-wheel is mounted, shifters for moving said type-wheel in opposite directions from normal and stop devices controlling the shift of said type-wheel, each of said shifters being arranged to shift said support to effect the impression of the selected type.

67. In automatic telegraphs, a type-wheel yieldingly held in normal position, a pivoted support whereon said type-wheel is mounted, a shifter for said type-wheel pivoted to said supports, separate shifter-arms actuating said type-wheel shifter and said support, connected thereto respectively on opposite sides of the shifter pivot but on the same side of the support pivot.

68. In automatic telegraphs, a type-wheel yieldingly held in normal position, a pivoted support whereon said type-wheel is mounted, a shifter for moving said type-wheel, a pair of shifter-arms connected to said shifter on opposite sides of its pivots whereby said shifter and type-wheel may be moved in opposite directions by said arms, stop devices controlling the shift of said type-wheel, selector mechanism controlling said stop devices, the points of connection between said arms and said shifter being on the same side of the pivot of said support, whereby when the rotation of the type-wheel is arrested by said stop devices, the support and type-wheel may be further shifted by said shifter arms to effect the impression of the selected type.

69. In automatic telegraphs, a type-wheel, a shiftable support whereon said type-wheel is mounted, a latch for holding said support in normal position, stop devices governing the shift of said type-wheel and arranged to control the release of said latch, and means arranged to rotate said type-wheel in opposite directions from normal until arrested by said stop devices and also arranged to further shift said support and type-wheel later, when said latch is released, to effect the impression of the selected type.

70. In automatic telegraphs, a type-wheel, a shifting support whereon said type-wheel is mounted, a pair of shifters for moving said type-wheel in opposite directions from normal and each arranged to shift said support in the same direction to effect the impression of the selected type, electro-magnets for respectively actuating said shifters, coöperating stop-devices governing the extent of government of said type-wheel, a set of shifting switches controlling said stop devices and the circuit of said electro-magnets, a series of selectors controlling said set of switches, a step-by-step governing device for said selectors and an operating relay for said governing device.

71. In automatic telegraphs, a type-wheel, a shifter for rotating said type-wheel, a stop-member connected to said type-wheel, a coöperating stop-arm, a set of governing arms controlling the shift of said stop-arm, selector mechanism controlling said set of governing-arms, a shifting member normally holding said governing arms and said stop-arm out of operation, means for actuating said shifting member to release said governing and stop-arms and to restore the same to normal position.

72. In automatic telegraphs, a type-wheel, a shifter for rotating said type-wheel to bring the selected type to the printing point, stop devices governing the shift of said type-wheel, electric selector mechanism controlling the shift of said stop devices, and means for shifting said type-wheel laterally step-by-step in letter-space direction.

73. In automatic telegraphs, a type-wheel, a shifter for rotating said type-wheel to bring the selected type to the printing point, stop devices governing the shift of said type-wheel, electric selector mechanism controlling the operation of said type-wheel shifter and said stop devices, means controlled by said type-wheel for effecting the step-by-step letter-space movement thereof and means automatically controlled by the letter-space movement of the type-wheel for restoring the same to commence a new line of print.

74. In automatic telegraphs, a type-wheel, a shifter for rotating said type-wheel to bring the selected type to the printing point, stop devices governing the shift of said type-wheel, electric selector mechanism controlling the operation of said type-wheel shifter and said stop devices, means controlled by said type-wheel for effecting the step-by-step letter-space movement thereof, means for restoring the type-wheel to commence a new line of print arranged to be actuated either automatically by the movement of said type-wheel or by said electric selector mechanism upon the transmission of a special signal over the line, a paper-holding mechanism and a line space feed therefor controlled by said type-wheel restoring means.

75. In automatic telegraphs, a rotatable type-wheel, a shiftable frame whereon said type-wheel is journaled, said wheel being laterally shiftable on said frame in letter-space direction, stop devices controlling the rotary shift of said wheel, a shifter for rotating said wheel into engagement with said stop devices to bring the selected type to the printing point, arranged to shift the supporting frame, a type-wheel to effect the impression of the selected type, electric selector mechanism controlling the operation of said stop devices and of said type-wheel shifter, and means controlled by the printing shift of said frame for effecting the step-by-step movement of the type-wheel in letter-space direction.

ALFRED C. GILMORE.

Witnesses:
FRED GERLACK,
HARRY L. CLAPP.